United States Patent
Kotsopoulos et al.

(10) Patent No.: US 12,067,663 B2
(45) Date of Patent: *Aug. 20, 2024

(54) SYSTEM FOR GENERATING MEDIA CONTENT ITEMS ON DEMAND

(71) Applicant: Snap Inc., Santa Monica, CA (US)

(72) Inventors: Bradley Kotsopoulos, Pickering (CA); Michael Kozakov, Toronto (CA); Yingying Wang, Marina del Rey, CA (US); Nicholas Hendriks, York (CA); Derek Spencer, Etobicoke (CA)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/058,157

(22) Filed: Nov. 22, 2022

(65) Prior Publication Data

US 2023/0162423 A1 May 25, 2023

Related U.S. Application Data

(63) Continuation of application No. 17/163,053, filed on Jan. 29, 2021, now Pat. No. 11,651,539.
(Continued)

(51) Int. Cl.
G06T 13/40 (2011.01)
G06F 3/04845 (2022.01)
(Continued)

(52) U.S. Cl.
CPC .......... *G06T 13/40* (2013.01); *G06F 3/04845* (2013.01); *G06T 13/80* (2013.01);
(Continued)

(58) Field of Classification Search
CPC ..... G06T 13/40; G06T 13/80; G06T 2200/24; G06T 13/00; G06F 3/04845;
(Continued)

(56) References Cited

U.S. PATENT DOCUMENTS 5,880,731 A  3/1999  Liles et al.
6,023,270 A  2/2000  Brush, II et al.
(Continued)

FOREIGN PATENT DOCUMENTS

CN   1980332 A    6/2007
CN   102450031    5/2012
(Continued)

OTHER PUBLICATIONS

"U.S. Appl. No. 17/831,075, Response filed Mar. 7, 2023 to Non Final Office Action mailed Dec. 8, 2022", 7 pgs.
(Continued)

*Primary Examiner* — Maurice L. McDowell, Jr.
(74) *Attorney, Agent, or Firm* — Schwegman Lundberg & Woessner, P.A.

(57) ABSTRACT

Method for generating media content items on demand starts with a processor receiving an animation file including a first metadata based on an animation input. The animation file is associated with a media content identification. The processor generates puppets associated with frames in the animation file using the first metadata. The processor causes a puppet matching interface to be displayed on a client device. The puppet matching interface includes one of the puppets in a first pose. The processor receives a puppet posing input associated with a second pose from the client device. The processor causes the one of the puppets to be displayed in the second pose in the puppet matching interface by the client device. The processor can also generate a second metadata based on the puppet posing input. Other embodiments are disclosed herein.

20 Claims, 17 Drawing Sheets

Related U.S. Application Data

(60) Provisional application No. 62/968,111, filed on Jan. 30, 2020.

(51) Int. Cl.
*G06T 13/80* (2011.01)
*H04N 21/239* (2011.01)
*H04N 21/262* (2011.01)
*H04N 21/44* (2011.01)
*H04N 21/81* (2011.01)
*H04N 21/84* (2011.01)

(52) U.S. Cl.
CPC ... *H04N 21/2393* (2013.01); *H04N 21/26258* (2013.01); *H04N 21/44* (2013.01); *H04N 21/8146* (2013.01); *H04N 21/84* (2013.01); *G06T 2200/24* (2013.01)

(58) Field of Classification Search
CPC ......... H04N 21/2393; H04N 21/26258; H04N 21/44; H04N 21/8146; H04N 21/84; A63F 13/795; A63F 2300/5553; A63F 2300/556; A63F 13/56
See application file for complete search history.

(56) References Cited

U.S. PATENT DOCUMENTS

| | | |
|---|---|---|
| 6,223,165 B1 | 4/2001 | Lauffer |
| 6,754,904 B1 | 6/2004 | Cooper et al. |
| 6,772,195 B1 | 8/2004 | Hatlelid et al. |
| 6,842,779 B1 | 1/2005 | Nishizawa |
| 6,889,325 B1 | 5/2005 | Sipman et al. |
| 7,248,270 B1 * | 7/2007 | Boylan ............... G06F 3/04815 |
| | | 715/861 |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,190,435 B2 | 5/2012 | Li-chun et al. |
| 8,253,745 B1 * | 8/2012 | Hahn ...................... G06T 13/40 |
| | | 345/474 |
| 8,290,423 B2 | 10/2012 | Wang et al. |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,537,166 B1 | 9/2013 | Diard et al. |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,650,603 B2 | 2/2014 | Doets et al. |
| 8,659,548 B2 | 2/2014 | Hildreth |
| 8,683,354 B2 | 3/2014 | Khandelwal et al. |
| 8,688,600 B2 | 4/2014 | Barton et al. |
| 8,692,830 B2 | 4/2014 | Nelson et al. |
| 8,725,829 B2 | 5/2014 | Wang et al. |
| 8,810,513 B2 | 8/2014 | Ptucha et al. |
| 8,811,885 B2 | 8/2014 | Wang |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 8,990,842 B2 | 3/2015 | Rowley et al. |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,114,689 B1 | 10/2018 | Yang et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,282,425 B2 | 5/2019 | Shaw et al. |
| 10,325,416 B1 | 6/2019 | Scapel et al. |
| 10,362,219 B2 | 7/2019 | Wilson et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 10,885,693 B1 | 1/2021 | Saragih et al. |
| 11,036,781 B1 | 6/2021 | Baril et al. |
| 11,178,433 B2 | 11/2021 | Hou |
| 11,263,254 B2 | 3/2022 | Baril et al. |
| 11,284,144 B2 | 3/2022 | Kotsopoulos et al. |
| 11,356,720 B2 | 6/2022 | Baril et al. |
| 11,651,022 B2 | 5/2023 | Baril et al. |
| 11,651,539 B2 * | 5/2023 | Kotsopoulos ........... G06T 13/80 |
| | | 345/473 |
| 11,729,441 B2 | 8/2023 | Baril et al. |

(56) References Cited

U.S. PATENT DOCUMENTS

| | | |
|---|---|---|
| 11,831,937 B2 | 11/2023 | Kotsopoulos et al. |
| 11,991,419 B2 | 5/2024 | Kotsopoulos et al. |
| 2002/0067362 A1 | 6/2002 | Agostino Nocera et al. |
| 2002/0072982 A1 | 6/2002 | Barton et al. |
| 2002/0083060 A1 | 6/2002 | Wang et al. |
| 2002/0169644 A1 | 11/2002 | Greene |
| 2002/0184634 A1 | 12/2002 | Cooper |
| 2004/0199387 A1 | 10/2004 | Wang et al. |
| 2005/0028195 A1 | 2/2005 | Feinleib et al. |
| 2005/0091274 A1 | 4/2005 | Stanford |
| 2005/0162419 A1 | 7/2005 | Kim et al. |
| 2005/0192863 A1 | 9/2005 | Mohan |
| 2005/0206610 A1 | 9/2005 | Cordelli |
| 2005/0209917 A1 | 9/2005 | Anderson et al. |
| 2006/0094500 A1 | 5/2006 | Dyke et al. |
| 2006/0195359 A1 | 8/2006 | Robinson et al. |
| 2006/0224452 A1 | 10/2006 | Ng |
| 2006/0224546 A1 * | 10/2006 | Ballin ................... G06T 17/00 706/62 |
| 2006/0256133 A1 | 11/2006 | Rosenberg |
| 2006/0294465 A1 | 12/2006 | Ronen et al. |
| 2007/0113181 A1 | 5/2007 | Blattner et al. |
| 2007/0124756 A1 | 5/2007 | Covell et al. |
| 2007/0130580 A1 | 6/2007 | Covell et al. |
| 2007/0143778 A1 | 6/2007 | Covell et al. |
| 2007/0168863 A1 | 7/2007 | Blattner et al. |
| 2007/0176921 A1 | 8/2007 | Iwasaki et al. |
| 2007/0179850 A1 | 8/2007 | Ganjon et al. |
| 2007/0192784 A1 | 8/2007 | Postrel |
| 2007/0214049 A1 | 9/2007 | Postrel |
| 2008/0052062 A1 | 2/2008 | Stanford |
| 2008/0158222 A1 | 7/2008 | Li et al. |
| 2009/0007200 A1 | 1/2009 | Amento et al. |
| 2009/0016617 A1 | 1/2009 | Bregman-amitai et al. |
| 2009/0044113 A1 | 2/2009 | Jones et al. |
| 2009/0046097 A1 | 2/2009 | Franklin |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0198701 A1 | 8/2009 | Haileselassie et al. |
| 2009/0202114 A1 | 8/2009 | Morin et al. |
| 2009/0265604 A1 | 10/2009 | Howard et al. |
| 2009/0271820 A1 | 10/2009 | Choi et al. |
| 2009/0293079 A1 | 11/2009 | Mckee et al. |
| 2009/0300525 A1 | 12/2009 | Jolliff et al. |
| 2009/0303984 A1 | 12/2009 | Clark et al. |
| 2009/0313670 A1 | 12/2009 | Takao |
| 2010/0011422 A1 | 1/2010 | Mason et al. |
| 2010/0023885 A1 | 1/2010 | Reville et al. |
| 2010/0030746 A1 | 2/2010 | Steelberg et al. |
| 2010/0034466 A1 | 2/2010 | Jing et al. |
| 2010/0070858 A1 | 3/2010 | Morris et al. |
| 2010/0083320 A1 | 4/2010 | Roberts et al. |
| 2010/0114713 A1 | 5/2010 | Anderson |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2010/0306655 A1 | 12/2010 | Mattingly et al. |
| 2011/0093780 A1 | 4/2011 | Dunn |
| 2011/0115798 A1 | 5/2011 | Nayar et al. |
| 2011/0131593 A1 | 6/2011 | Scott et al. |
| 2011/0145327 A1 | 6/2011 | Stewart |
| 2011/0148864 A1 | 6/2011 | Lee et al. |
| 2011/0239136 A1 | 9/2011 | Goldman et al. |
| 2011/0273455 A1 | 11/2011 | Powar et al. |
| 2012/0011545 A1 | 1/2012 | Doets et al. |
| 2012/0013621 A1 | 1/2012 | Ospina |
| 2012/0016926 A1 | 1/2012 | Toga et al. |
| 2012/0076310 A1 | 3/2012 | Debusk et al. |
| 2012/0113106 A1 | 5/2012 | Choi et al. |
| 2012/0117596 A1 | 5/2012 | Mountain et al. |
| 2012/0124458 A1 | 5/2012 | Cruzada |
| 2012/0124608 A1 | 5/2012 | Postrel |
| 2012/0130717 A1 | 5/2012 | Xu et al. |
| 2012/0190456 A1 | 7/2012 | Rogers |
| 2012/0191231 A1 | 7/2012 | Wang |
| 2012/0221131 A1 | 8/2012 | Wang et al. |
| 2012/0295560 A1 | 11/2012 | Mufti |
| 2012/0297400 A1 | 11/2012 | Hill et al. |
| 2012/0316969 A1 | 12/2012 | Metcalf, III |
| 2012/0317240 A1 | 12/2012 | Wang |
| 2013/0010204 A1 | 1/2013 | Wang |
| 2013/0029762 A1 | 1/2013 | Klappert |
| 2013/0031579 A1 | 1/2013 | Klappert |
| 2013/0042262 A1 | 2/2013 | Riethmueller |
| 2013/0044051 A1 | 2/2013 | Jeong |
| 2013/0067512 A1 | 3/2013 | Dion et al. |
| 2013/0073366 A1 | 3/2013 | Heath |
| 2013/0073377 A1 | 3/2013 | Heath |
| 2013/0080242 A1 | 3/2013 | Alhadeff et al. |
| 2013/0080262 A1 | 3/2013 | Scott et al. |
| 2013/0085828 A1 | 4/2013 | Schuster |
| 2013/0103760 A1 | 4/2013 | Golding et al. |
| 2013/0111519 A1 | 5/2013 | Rice et al. |
| 2013/0124073 A1 | 5/2013 | Ren |
| 2013/0201187 A1 | 8/2013 | Tong et al. |
| 2013/0242031 A1 | 9/2013 | Petterson et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0078148 A1 | 3/2014 | Diard et al. |
| 2014/0125678 A1 | 5/2014 | Wang et al. |
| 2014/0129343 A1 | 5/2014 | Finster et al. |
| 2014/0137139 A1 | 5/2014 | Jones et al. |
| 2014/0214532 A1 | 7/2014 | Barton et al. |
| 2014/0278845 A1 | 9/2014 | Teiser et al. |
| 2014/0306884 A1 | 10/2014 | Sano et al. |
| 2015/0032798 A1 | 1/2015 | Van Bemmel |
| 2015/0066712 A1 | 3/2015 | Altieri |
| 2015/0071613 A1 | 3/2015 | Dharssi et al. |
| 2015/0128180 A1 | 5/2015 | Mountain et al. |
| 2015/0206349 A1 | 7/2015 | Rosenthal et al. |
| 2015/0229979 A1 | 8/2015 | Wood et al. |
| 2015/0237389 A1 | 8/2015 | Grouf et al. |
| 2015/0244754 A1 | 8/2015 | Beckham, Jr. |
| 2015/0264416 A1 | 9/2015 | Heinz, II et al. |
| 2016/0014482 A1 | 1/2016 | Chen et al. |
| 2016/0117147 A1 | 4/2016 | Zambetti et al. |
| 2016/0127793 A1 | 5/2016 | Grouf et al. |
| 2016/0134840 A1 | 5/2016 | Mcculloch |
| 2016/0134938 A1 | 5/2016 | Miyazaki et al. |
| 2016/0165287 A1 | 6/2016 | Wood et al. |
| 2016/0188709 A1 | 6/2016 | Doerring et al. |
| 2016/0234149 A1 | 8/2016 | Tsuda et al. |
| 2016/0323650 A1 | 11/2016 | Grouf et al. |
| 2017/0078727 A1 | 3/2017 | Wood et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0220314 A1 | 8/2017 | Kaneko et al. |
| 2017/0235848 A1 | 8/2017 | Van Dusen et al. |
| 2017/0256086 A1 * | 9/2017 | Park ........................ G06T 7/73 |
| 2017/0272380 A1 | 9/2017 | Rao et al. |
| 2017/0310934 A1 | 10/2017 | Du et al. |
| 2017/0312634 A1 | 11/2017 | Ledoux et al. |
| 2017/0318065 A1 | 11/2017 | Davies et al. |
| 2017/0324995 A1 | 11/2017 | Grouf et al. |
| 2017/0337841 A1 | 11/2017 | Styles |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0197343 A1 | 7/2018 | Hare et al. |
| 2018/0262783 A1 | 9/2018 | Yang et al. |
| 2018/0262805 A1 | 9/2018 | Grouf et al. |
| 2018/0315076 A1 | 11/2018 | Andreou |
| 2018/0315133 A1 | 11/2018 | Brody et al. |
| 2018/0315134 A1 | 11/2018 | Amitay et al. |

(56) References Cited

U.S. PATENT DOCUMENTS

| | | |
|---|---|---|
| 2018/0350144 A1 | 12/2018 | Rathod |
| 2018/0374145 A1 | 12/2018 | Koon et al. |
| 2019/0001223 A1 | 1/2019 | Blackstock et al. |
| 2019/0057616 A1 | 2/2019 | Cohen et al. |
| 2019/0188920 A1 | 6/2019 | Mcphee et al. |
| 2019/0250795 A1 | 8/2019 | Weldemariam et al. |
| 2019/0286847 A1 | 9/2019 | Kato |
| 2019/0289354 A1 | 9/2019 | Garcia et al. |
| 2019/0320141 A1 | 10/2019 | Almheiri |
| 2019/0377345 A1 | 12/2019 | Bachrach et al. |
| 2020/0104020 A1 | 4/2020 | Grantham et al. |
| 2021/0011939 A1 | 1/2021 | Sardar et al. |
| 2021/0125393 A1 | 4/2021 | Sumner et al. |
| 2021/0241512 A1 | 8/2021 | Kotsopoulos et al. |
| 2021/0243482 A1 | 8/2021 | Baril et al. |
| 2021/0243487 A1 | 8/2021 | Kotsopoulos et al. |
| 2021/0243503 A1 | 8/2021 | Kotsopoulos et al. |
| 2021/0342384 A1 | 11/2021 | Baril et al. |
| 2022/0253475 A1 | 8/2022 | Baril et al. |
| 2022/0368960 A1 | 11/2022 | Baril et al. |
| 2023/0088471 A1 | 3/2023 | Kotsopoulos et al. |
| 2023/0273948 A1 | 8/2023 | Baril et al. |
| 2024/0098326 A1 | 3/2024 | Kotsopoulos et al. |
| 2024/0187702 A1 | 6/2024 | Kotsopoulos et al. |

FOREIGN PATENT DOCUMENTS

| | | |
|---|---|---|
| CN | 104170374 | 11/2014 |
| CN | 104205171 | 12/2014 |
| CN | 107645655 A | 1/2018 |
| CN | 108475280 | 8/2018 |
| CN | 108476329 | 8/2018 |
| CN | 108876877 A | 11/2018 |
| CN | 106294828 B | 5/2019 |
| CN | 109863527 | 6/2019 |
| CN | 109863532 A | 6/2019 |
| CN | 110168478 A | 8/2019 |
| CN | 110168586 A | 8/2019 |
| CN | 110769305 B | 5/2021 |
| CN | 115004714 | 9/2022 |
| CN | 115039401 A | 9/2022 |
| CN | 115175748 A | 10/2022 |
| CN | 115039401 B | 1/2024 |
| CN | 118042218 A | 5/2024 |
| EP | 2184092 A2 | 5/2010 |
| EP | 3404659 A1 | 11/2018 |
| EP | 2591618 B1 | 5/2019 |
| JP | 2001230801 A | 8/2001 |
| JP | 5497931 B2 | 3/2014 |
| KR | 20070014408 A | 2/2007 |
| KR | 101445263 B1 | 9/2014 |
| KR | 20140129171 A | 11/2014 |
| KR | 20180081783 A | 7/2018 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2018081013 A1 | 5/2018 |
| WO | WO-2018102562 A1 | 6/2018 |
| WO | WO-2018129531 A1 | 7/2018 |
| WO | WO-2019089613 A1 | 5/2019 |
| WO | WO-2021154998 A1 | 8/2021 |
| WO | WO-2021155249 A1 | 8/2021 |
| WO | WO-2021155394 A1 | 8/2021 |

OTHER PUBLICATIONS

"U.S. Appl. No. 17/653,389, Non Final Office Action mailed Mar. 14, 2023", 21 pgs.

"U.S. Appl. No. 17/831,075, Notice of Allowance mailed Mar. 30, 2023", 8 pgs.

"U.S. Appl. No. 17/163,053, Corrected Notice of Allowability mailed Apr. 3, 2023", 2 pgs.

"Chinese Application Serial No. 202180012043.X, Voluntary Amendment Filed Jan. 31, 2023", w English Claims, 16 pgs.

"Application Serial No. 17/583,784, Corrected Notice of Allowability mailed Apr. 10, 2023", 2 pgs.

"U.S. Appl. No. 16/777,793, Corrected Notice of Allowability mailed Feb. 15, 2022", 2 pgs.

"U.S. Appl. No. 16/777,793, Corrected Notice of Allowability mailed May 13, 2022", 2 pgs.

"U.S. Appl. No. 16/777,793, Final Office Action mailed May 13, 2021", 10 pgs.

"U.S. Appl. No. 16/777,793, Non Final Office Action mailed Sep. 2, 2021", 10 pgs.

"U.S. Appl. No. 16/777,793, Non Final Office Action mailed Dec. 10, 2020", 9 pgs.

"U.S. Appl. No. 16/777,793, Notice of Allowance mailed Feb. 2, 2022", 8 pgs.

"U.S. Appl. No. 16/777,793, Response filed Mar. 10, 21 to Non Final Office Action mailed Dec. 10, 2020", 9 pgs.

"U.S. Appl. No. 16/777,793, Response filed Aug. 13, 2021 to Final Office Action mailed May 13, 2021", 9 pgs.

"U.S. Appl. No. 16/777,793, Response filed Dec. 2, 21 to Non Final Office Action mailed Sep. 2, 2021", 9 pgs.

"U.S. Appl. No. 16/777,798, Final Office Action mailed Oct. 21, 2021", 30 pgs.

"U.S. Appl. No. 16/777,798, Final Office Action mailed Oct. 28, 2022", 34 pgs.

"U.S. Appl. No. 16/777,798, Non Final Office Action mailed Apr. 7, 2021", 14 pgs.

"U.S. Appl. No. 16/777,798, Non Final Office Action mailed Apr. 20, 2022", 32 pgs.

"U.S. Appl. No. 16/777,798, Response filed Feb. 21, 2022 to Final Office Action mailed Oct. 21, 2021", 12 pgs.

"U.S. Appl. No. 16/777,798, Response filed Jul. 7, 2021 to Non Final Office Action mailed Apr. 7, 2021", 10 pgs.

"U.S. Appl. No. 16/777,798, Response filed Jul. 20, 2022 to Non Final Office Action mailed Apr. 20, 2022", 11 pgs.

"U.S. Appl. No. 16/777,799, Corrected Notice of Allowability mailed Mar. 3, 2021", 2 pgs.

"U.S. Appl. No. 16/777,799, Corrected Notice of Allowability mailed Apr. 9, 2021", 2 pgs.

"U.S. Appl. No. 16/777,799, Corrected Notice of Allowability mailed May 20, 2021", 2 pgs.

"U.S. Appl. No. 16/777,799, Non Final Office Action mailed Oct. 29, 2020", 16 pgs.

"U.S. Appl. No. 16/777,799, Notice of Allowance mailed Feb. 16, 2021", 9 pgs.

"U.S. Appl. No. 16/777,799, Response filed Jan. 29, 2021 to Non Final Office Action mailed Oct. 29, 2020", 10 pgs.

"U.S. Appl. No. 16/777,817, Corrected Notice of Allowability mailed Nov. 24, 2021", 2 pgs.

"U.S. Appl. No. 16/777,817, Non Final Office Action mailed Feb. 2, 2021", 25 pgs.

"U.S. Appl. No. 16/777,817, Notice of Allowance mailed May 26, 2021", 8 pgs.

"U.S. Appl. No. 16/777,817, Notice of Allowance mailed Nov. 16, 2021", 5 pgs.

"U.S. Appl. No. 16/777,817, Response filed May 3, 2021 to Non Final Office Action mailed Feb. 2, 2021", 7 pgs.

"U.S. Appl. No. 17/163,053, Corrected Notice of Allowability mailed Dec. 7, 2022", 2 pgs.

"U.S. Appl. No. 17/163,053, Non Final Office Action mailed Mar. 24, 2022", 9 pgs.

"U.S. Appl. No. 17/163,053, Notice of Allowance mailed Jul. 13, 2022", 10 pgs.

"U.S. Appl. No. 17/163,053, Response filed Jun. 24, 2022 to Non Final Office Action mailed Mar. 24, 2022", 8 pgs.

(56) References Cited

OTHER PUBLICATIONS

"U.S. Appl. No. 17/163,053, Supplemental Notice of Allowability mailed Nov. 4, 2022", 2 pgs.
"U.S. Appl. No. 17/327,050, Corrected Notice of Allowability mailed Nov. 4, 2021", 5 pgs.
"U.S. Appl. No. 17/327,050, Corrected Notice of Allowability mailed Dec. 8, 2021", 2 pgs.
"U.S. Appl. No. 17/327,050, Notice of Allowance mailed Oct. 20, 2021", 9 pgs.
"U.S. Appl. No. 17/327,050, Preliminary Amendment filed Jul. 27, 2021", 8 pgs.
"U.S. Appl. No. 17/583,784, Preliminary Amendment filed May 3, 2022", 8 pgs.
"U.S. Appl. No. 17/831,075, Preliminary Amendment filed Aug. 3, 2022", 7 pgs.
"FFmpeg Formats Documentation", FFMpeg, [Online] Retrieved from the Internet: <URL: https://web.archive.org/web/20190718073211/https://ffmpeg.org/ffmpeg-formats.html>, (Jul. 18, 2019), 43 pgs.
"FFmpeg Protocols Documentation", FFmpeg, [Online] Retrieved from the Internet: <URL: https://web.archive.org/web/20190718073211/https://ffmpeg.org/ffmpeg-protocols.html>, (Jul. 18, 2019), 29 pgs.
"International Application Serial No. PCT/US2021/015497, International Preliminary Report on Patentability mailed Aug. 11, 2022", 8 pgs.
"International Application Serial No. PCT/US2021/015497, International Search Report mailed Apr. 26, 2021", 5 pgs.
"International Application Serial No. PCT/US2021/015497, Written Opinion mailed Apr. 26, 2021", 6 pgs.
"International Application Serial No. PCT/US2021/015854, International Preliminary Report on Patentability mailed Aug. 11, 2022", 11 pgs.
"International Application Serial No. PCT/US2021/015854, International Search Report mailed Apr. 1, 2021", 5 pgs.
"International Application Serial No. PCT/US2021/015854, Written Opinion mailed Apr. 1, 2021", 9 pgs.
"International Application Serial No. PCT/US2021/070063, International Preliminary Report on Patentability mailed Aug. 11, 2022", 9 pgs.
"International Application Serial No. PCT/US2021/070063, International Search Report mailed Apr. 22, 2021", 4 pgs.
"International Application Serial No. PCT/US2021/070063, Written Opinion mailed Apr. 22, 2021", 7 pgs.
"NVIDIA System Management Interface", NVIDIA Corp, [Online] Retrieved from the Internet: < URL: https://web.archive.org/web/20190713225750/https://developer.nvidia.com/nvidia-system-management-interface>, (Jul. 13, 2019), 3 pgs.
"SYLLO/NVTOP?: What is NVTOP?", GitHub, [Online] Retrieved from the Internet: <URL: https://web.archive.org/web/20190302055249/https://github.com/Syllo/nvtop>, (Mar. 2, 2019), 4 pgs.
"Video Encode and Decode GPU Support Matrix", NVIDIA Corp, [Online] Retrieved from the Internet: < URL: https://web.archive.org/web/20190629142230/https://developer.nvidia.com/video-encode-decode-gpu-support-matrix>, (Jun. 29, 2019), 3 pgs.
"What exactly is Fragmented mp4(fMP4)? How is it different from normal mp4?", stack overflow, [Online] Retrieved from the Internet: <URL: https://web.archive.org/web/20160626215532/https://stackoverflow.com/questions/35177797/what-exactly-is-fragmented-mp4fmp4-how-is-it-different-from-normal-mp4>, (Feb. 3, 2016), 2 pgs.
Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.
Constine, Josh, "Meet 'Genies,' the lifelike personalized avatars that reenact news", TechCrunch, [Online] Retrieved from the Internet: <URL: https://techcrunch.com/2017/12/08/genies/>, (Dec. 8, 2017), 22 pgs.

Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.
Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 3, 20200), 13 pgs.
Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.
Pantos, R, et al., "HTTP Live Streaming", Internet Engineering Task Force (IETF), [Online] Retrieved from the Internet: <URL: https://web.archive.org/web/20190718102609/https://tools.ietf.org/html/rfc8216>, (Aug. 2017), 62 pgs.
Siglin, Timothy, "Unifying Global Video Strategies: MP4 File Fragmentation For Broadcast, Mobile and Web Delivery", Transitions, Inc., (Nov. 16, 2011), 16 pgs.
"U.S. Appl. No. 17 653,389, Response filed Jun. 14, 2023 to Non Final Office Action mailed Mar. 14, 2023", 9 pgs.
"U.S. Appl. No. 16 777,798, Non Final Office Action mailed Jun. 16, 2023", 23 pgs.
"European Application Serial No. 21707592.8, Communication Pursuant to Article 94(3) EPC mailed Jun. 19, 2023", 5 pgs.
"Chinese Application Serial No. 202180011951.7, Office Action mailed Jun. 1, 2023", W English Translation, 15 pgs.
"U.S. Appl. No. 17/653,389, Notice of Allowance mailed Jul. 19, 2023", 7 pgs.
"U.S. Appl. No. 17/831,075, Corrected Notice of Allowability mailed Jul. 19, 2023", 2 pgs.
"U.S. Appl. No. 17/653,389, Corrected Notice of Allowability mailed Aug. 7, 2023", 2 pgs.
"U.S. Appl. No. 17/583,784, Notice of Allowance mailed Dec. 2, 2022", 9 pgs.
"U.S. Appl. No. 17/653,389, Preliminary Amendment filed Dec. 7, 2022", 6 pgs.
"U.S. Appl. No. 17/831,075, Non Final Office Action mailed Dec. 8, 2022", 7 pgs.
"U.S. Appl. No. 17/583,784, Corrected Notice of Allowability mailed Dec. 14, 2022", 2 pgs.
"U.S. Appl. No. 16/777,798, Response filed Jan. 20, 2023 to Final Office Action mailed Oct. 28, 2022", 13 pgs.
U.S. Appl. No. 16/777,817 U.S. Pat. No. 11,284,144, filed Jan. 30, 2020, Video Generation System to Render Frames on Demand Using A Fleet of GPUS.
U.S. Appl. No. 17/653,389, filed Mar. 3, 2022, Video Generation System to Render Frames on Demand Using a Fleet of GPUS.
U.S. Appl. No. 16/777,793 U.S. Pat. No. 11,356,720, filed Jan. 30, 2020, Video Generatio System to Render Frames on Demand.
U.S. Appl. No. 17/831,075, filed Jun. 2, 2022, Video Generation System to Render Frames on Demand.
U.S. Appl. No. 16/777,798, filed Jan. 30, 2020, Selecting Avatars to be Included in the Video Being Generated on Demand.
U.S. Appl. No. 17/163,053, filed Jan. 29, 2021, System for Generating Media Content Items on Demand.
U.S. Appl. No. 16/777,799 U.S. Pat. No. 11,036,781, filed Jan. 30, 2020, Video Generation System to Render Frames on Demand Using a Fleet of Servers.
U.S. Appl. No. 17/583,784, filed Jan. 25, 2022, Video Generation System to Render Frames on Demand Using a Fleet of Servers.
U.S. Appl. No. 17/327,050, U.S. Pat. No. 11,263,254, filed May 21, 2021, Video Generation System to Render Frames on Demand Using a Fleet of Servers.
"U.S. Appl. No. 16/777,798, Corrected Notice of Allowability mailed Feb. 28, 2024", 2 pgs.
"U.S. Appl. No. 16/777,798, Corrected Notice of Allowability mailed Nov. 24, 2023", 2 pgs.
"U.S. Appl. No. 16/777,798, Notice of Allowance mailed Nov. 14, 2023", 7 pgs.
"U.S. Appl. No. 16/777,798, Response filed Sep. 18, 2023 to Non Final Office Action mailed Jun. 16, 2023", 11 pgs.

(56) References Cited

OTHER PUBLICATIONS

"U.S. Appl. No. 18/144,755, Non Final Office Action mailed Dec. 5, 2023", 9 pgs.

"U.S. Appl. No. 18/144,755, Response filed Feb. 29, 2024 to Non Final Office Action mailed Dec. 5, 2023", 6 pgs.

"Chinese Application Serial No. 202180011914.6, Office Action mailed Feb. 2, 2024", w/ English Translation, 23 pgs.

"Chinese Application Serial No. 202180012043.X, Office Action mailed Oct. 11, 2023", w/ English Translation, 10 pgs.

"European Application Serial No. 21707852.6, Communication Pursuant to Article 94(3) EPC mailed Dec. 18, 2023", 6 pgs.

"Korean Application Serial No. 10-2022-7029459, Notice of Preliminary Rejection mailed Jan. 12, 2024", w/ English Translation, 16 pgs.

"Korean Application Serial No. 10-2022-7029477, Notice of Preliminary Rejection mailed Jan. 12, 2024", w/ English Translation, 15 pgs.

"U.S. Appl. No. 18/144,755, Notice of Allowance mailed Mar. 13, 2024", 5 pgs.

"Chinese Application Serial No. 202180012043.X, Response filed Mar. 13, 2024 to Office Action mailed Oct. 11, 2023", W English Claims, 13 pgs.

"U.S. Appl. No. 16/777,798, Corrected Notice of Allowability mailed Apr. 15, 24", 2 pgs.

"U.S. Appl. No. 18/144,755, Corrected Notice of Allowability mailed Jun. 21, 24", 2 pgs.

"U.S. Appl. No. 18/520,203, Non Final Office Action mailed Jun. 12, 24", 13 pgs.

"Chinese Application Serial No. 202180011914.6, Response filed May 31, 2024 to Office Action mailed Feb. 2, 2024", w/ English Claims, 16 pgs.

* cited by examiner

| | 2:36PM | |
|---|---|---|
| Guide | 2:30 | 3:00 |
| 137 | GONE WITH THE WIND (1939) | |
| 141 | USAGI YOJIMBO | SURVIVOR |
| 142 | THE SMURFS | SAY NO TO THE DRESS |
| 143 | JEM AND THE HOLO... | FULL HOUSE |
| 144 | WHO FRAMED ROGER RABBIT (1988) | |
| 145 | HEAVY METAL(1981) | WHEEL OF FORTUNE |
| 146 | DOUG JUDY'S JAZZ MARATHON | |
| 147 | M*A*S*H | M*A*S*H |
| 148 | GOLDEN GIRLS | NIGHT COURT |
| 149 | DARK CRYSTAL (1982) | |
| 150 | RUSH HOUR 2 (2001) | |
| 151 | BONE: CROWN OF HORNS | RUSH HOUR 2 (2001) |
| 152 | SHREK 8: I CAME IN LIKE A SHREKING BALL | |
| 153 | HOME IMPROVEMENT | RUSH HOUR 2 (2001) |

FIG. 12

SYSTEM FOR GENERATING MEDIA CONTENT ITEMS ON DEMAND

CROSS-REFERENCE TO RELATED APPLICATIONS

This patent application is a continuation of U.S. patent application Ser. No. 17/163,053, filed Jan. 29, 2021, which application claims the benefit of priority to U.S. Provisional Patent Application Ser. No. 62/968,111, filed on Jan. 30, 2020, which is hereby incorporated by reference herein in its entirety.

This application is related to U.S. patent application Ser. No. 16/777,793, filed Jan. 30, 2020, the contents of which are incorporated herein by reference in their entirety; U.S. patent application Ser. No. 16/777,798, filed Jan. 30, 2020, the contents of which are incorporated herein by reference in their entirety; U.S. patent application Ser. No. 16/777,817, filed Jan. 30, 2020, the contents of which are incorporated herein by reference in their entirety; and U.S. patent application Ser. No. 16/777,799, filed Jan. 30, 2020, the contents of which are incorporated herein by reference in their entirety.

BACKGROUND

The popularity of social networking systems continues to grow and users increasingly use customized avatars within electronic messages such as text messages, emails, chats, reflecting a global demand to communicate more visually.

These customized avatars can be personalized by the users to represent the users in various applications, video games, messaging services, etc. Since the customized avatars can be generated in a different array of situations, displaying various emotions, or even be animated, the users are able to communicate their feelings more accurately in messages using the customized avatars. The users can use the customized avatars as a virtual extension of themselves online.

Moreover, with the increasing number of users on social networking systems, each user also has a growing network of individuals that she follows. n order to maintain the user's engagement on social networking systems, it is paramount that the systems have the ability to present to each user the media content items that are most interesting or relevant to her. In addition to the need to curate the media content items, the social networking systems are also presented with the challenge of providing a graphical user interface that captivates the user's attention and allows her to view the curated media content items and further interact the network of individuals that she follows.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 12 illustrates an example of a user interface 1200 being displayed by the client device in accordance with one embodiment.

DETAILED DESCRIPTION

Figure 1:
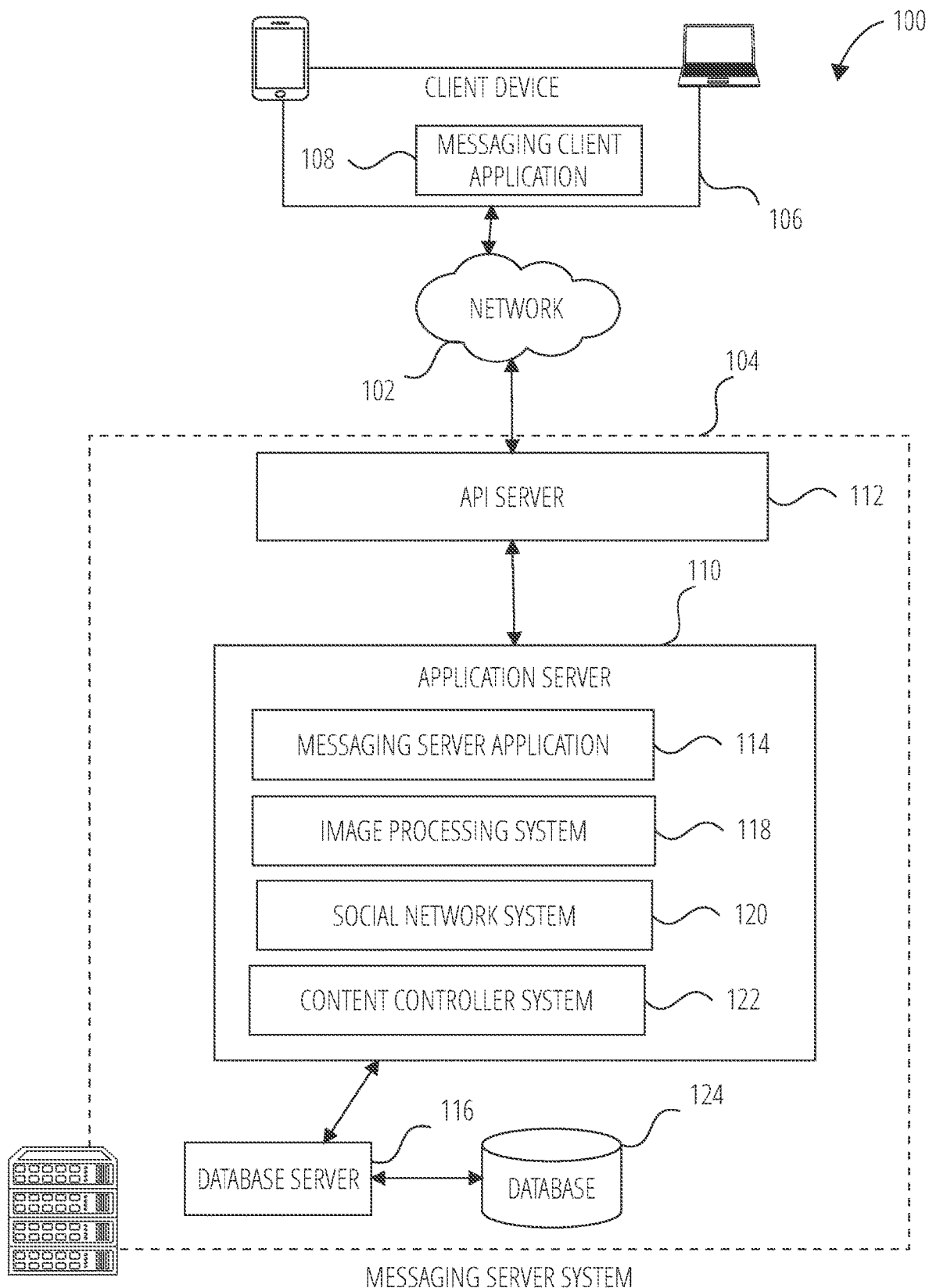
FIG. 1 is a diagrammatic representation of a networked environment in which the present disclosure may be deployed, in accordance with some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

With the customized avatar increasingly being used as a virtual extension of a user online, the messaging system 100 can further engage the user by creating content (e.g., video content) that can feature the user's avatar as well as the user's connections' avatars. The content can be in the form of a number of episodes in a series like a television series that is released periodically (e.g., daily, weekly, monthly, etc.)

As used herein, an "avatar" of a user is any visual representation of user. The avatar of a user may be based on information (e.g., characteristics) derived from images of the user in conjunction with the avatar characteristics identified from the user's relationships with other users. Alternatively or additionally, the user may select and customize characteristics of the user's avatar via the user's computing device. Such avatar characteristics may include, for example, the user's bodily features (e.g., muscular, thin, etc.), facial features, clothing and accessories, text displayed in conjunction with the avatar, and images displayed in conjunction with the avatar.

On digital content platforms, the content is generated beforehand, uploaded to a server and delivered to the user's device upon receiving a request by the user. However, given that the content needs to be personalized to feature the user's avatar and/or the user's friend's avatar, it would be challenging to individually generate content for each of the millions users on the messaging system 100 and wait for the user to request the content. Further, the users on the messaging system 100 customize their avatars on a whim and further interact with different users on the messaging system 100 such that it would also be challenging to generate content before hand includes up-to-date avatars.

Embodiments of the present invention improve on the functionality of electronic messaging and imaging software and systems by rendering the video content including the user's avatar on demand. Thus, the video content is personalized to the requesting user just in time for delivery to the user's client device 106. Accordingly, embodiments of the present invention can receive from a content creator, for example, an animation (e.g., media content item) with a placeholder avatar and when the user requests the media content item, the placeholder avatar is replaced with the user's avatar and the media content item that is personalized to the requesting user is transmitted to the user's device.

Embodiments of the present invention further improve on the functionality of electronic messaging and imaging software and systems by minimizing the delay between the requesting and transmitting of the media content item to the user's device, by selecting the relevant avatars to be incorporated into the media content item, and by simplifying the animation process for the content creators.

FIG. 1 is a block diagram showing an example messaging system 100 for exchanging data (e.g., messages and associated content) over a network. The messaging system 100 includes multiple instances of a client device 106, each of which hosts a number of applications including a messaging client application 108. Each messaging client application 108 is communicatively coupled to other instances of the messaging client application 108 and a messaging server system 104 via a network 102 (e.g., the Internet).

A messaging client application 108 is able to communicate and exchange data with another messaging client application 108 and with the messaging server system 104 via the network 102. The data exchanged between messaging client application 108, and between a messaging client application 108 and the messaging server system 104, includes functions (e.g., commands to invoke functions) as well as payload data (e.g., text, audio, video or other multimedia data).

The messaging server system 104 provides server-side functionality via the network 102 to a particular messaging client application 108. While certain functions of the messaging system 100 are described herein as being performed by either a messaging client application 108 or by the messaging server system 104, the location of certain functionality either within the messaging client application 108 or the messaging server system 104 is a design choice. For example, it may be technically preferable to initially deploy certain technology and functionality within the messaging server system 104, but to later migrate this technology and functionality to the messaging client application 108 where a client device 106 has a sufficient processing capacity.

The messaging server system 104 supports various services and operations that are provided to the messaging client application 108. Such operations include transmitting data to, receiving data from, and processing data generated by the messaging client application 108. This data may include, message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 108.

Turning now specifically to the messaging server system 104, an Application Program Interface (API) server 112 is coupled to, and provides a programmatic interface to, an application server 110. The application server 110 is communicatively coupled to a database server 116, which facilitates access to a database 124 in which is stored data associated with messages processed by the application server 110.

The Application Program Interface (API) server 112 receives and transmits message data (e.g., commands and message payloads) between the client device 106 and the application server 110. Specifically, the Application Program Interface (API) server 112 provides a set of interfaces (e.g., routines and protocols) that can be called or queried by the messaging client application 108 in order to invoke functionality of the application server 110. The Application Program Interface (API) server 112 exposes various functions supported by the application server 110, including account registration, login functionality, the sending of messages, via the application server 110, from a particular messaging client application 108 to another messaging client application 108, the sending of media files (e.g., images or video) from a messaging client application 108 to the messaging server application 114, and for possible access by another messaging client application 108, the setting of a collection of media data (e.g., story), the retrieval of a list of friends of a user of a client device 106, the retrieval of such collections, the retrieval of messages and content, the adding and deletion of friends to a social graph, the location of friends within a social graph, and opening an application event (e.g., relating to the messaging client application 108).

The application server 110 hosts a number of applications and subsystems, including a messaging server application 114, an image processing system 118, a social network system 120, and a content controller system 122. The messaging server application 114 implements a number of message processing technologies and functions, particularly related to the aggregation and other processing of content (e.g., textual and multimedia content) included in messages received from multiple instances of the messaging client application 108. As will be described in further detail, the text and media content from multiple sources may be aggregated into collections of content (e.g., called stories or galleries). These collections are then made available, by the messaging server application 114, to the messaging client application 108. Other processor and memory intensive processing of data may also be performed server-side by the messaging server application 114, in view of the hardware requirements for such processing.

The application server 110 also includes an image processing system 118 that is dedicated to performing various image processing operations, typically with respect to images or video received within the payload of a message at the messaging server application 114.

Figure 3:
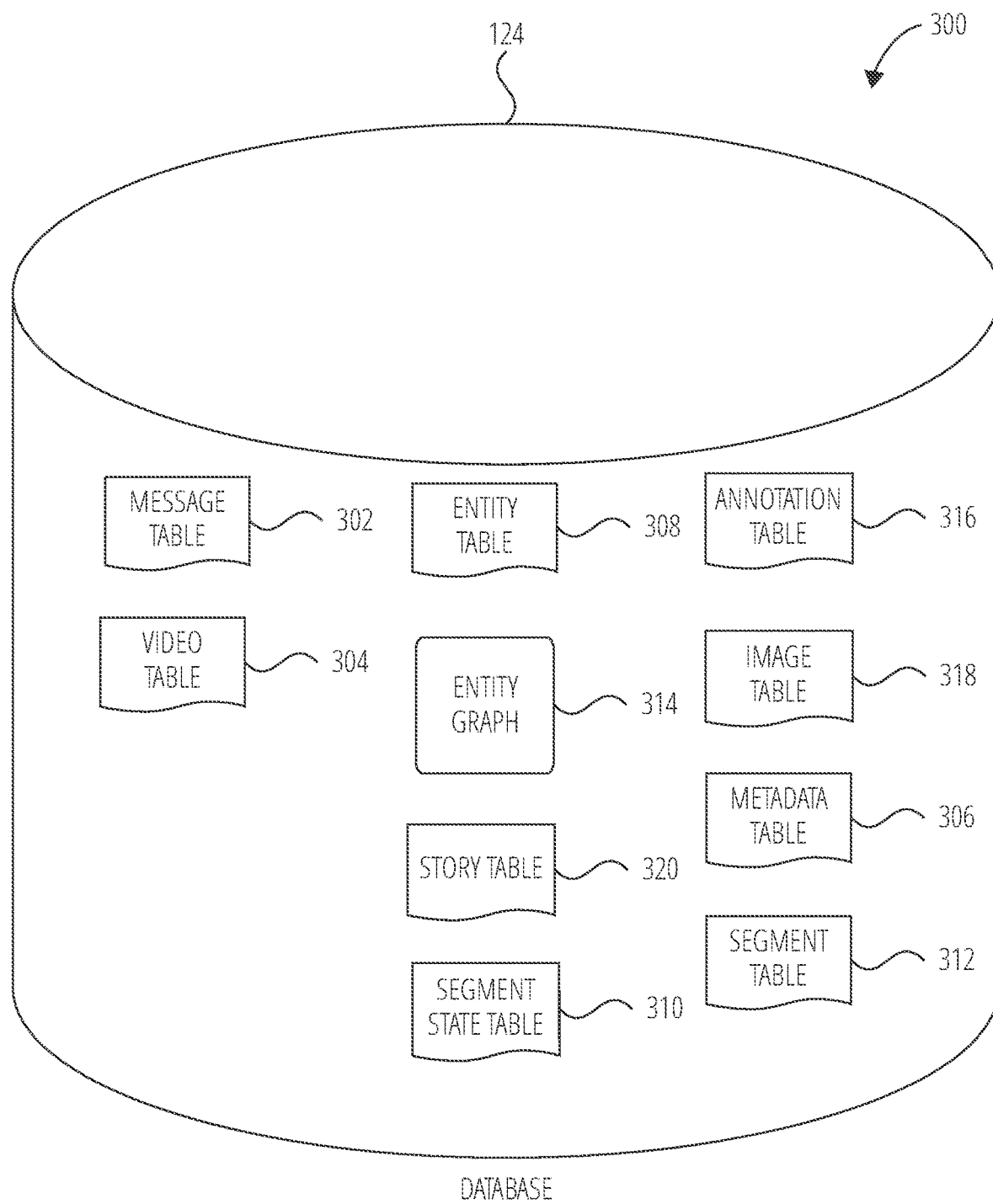
FIG. 3 is a diagrammatic representation of a data structure as maintained in a database, in accordance with some example embodiments.

The social network system 120 supports various social networking functions services, and makes these functions and services available to the messaging server application 114. To this end, the social network system 120 maintains and accesses an entity graph 314 (as shown in FIG. 3) within the database 124. Examples of functions and services supported by the social network system 120 include the identification of other users of the messaging system 100 with which a particular user has relationships or is "following", and also the identification of other entities and interests of a particular user.

The application server 110 is communicatively coupled to a database server 116, which facilitates access to a database 124 in which is stored data associated with messages processed by the messaging server application 114.

Figure 5:
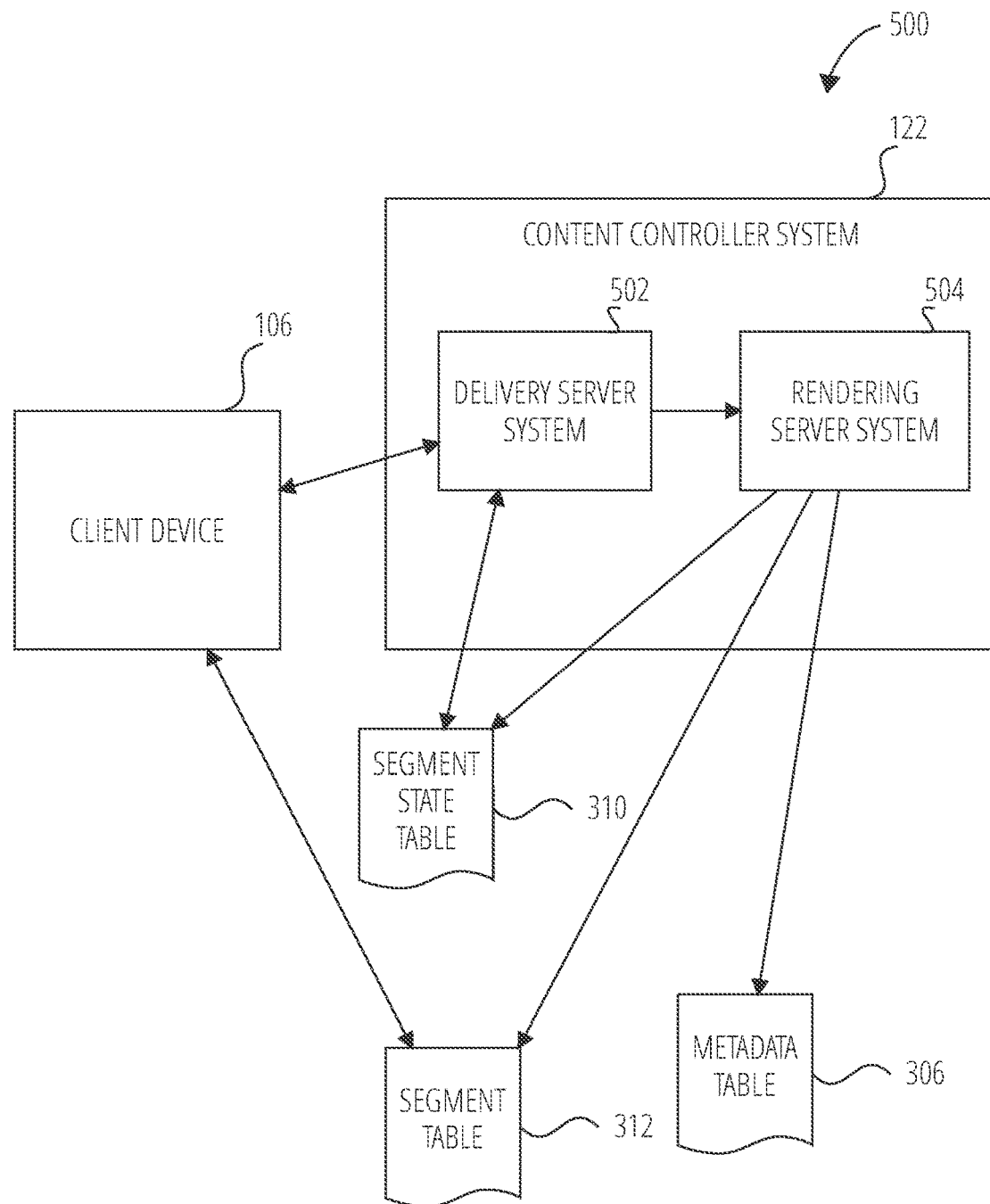
FIG. 5 is a diagrammatic representation of the details of the networked environment in which the present disclosure may be deployed, in accordance with some example embodiments.

The content controller system 122 is dedicated to manage the media content items that are rendered to include the user of the client device 106's avatar on demand. The content controller system 122 can include a Delivery server system 502 and a Rendering server system 504, as shown in FIG. 5.

Figure 2:
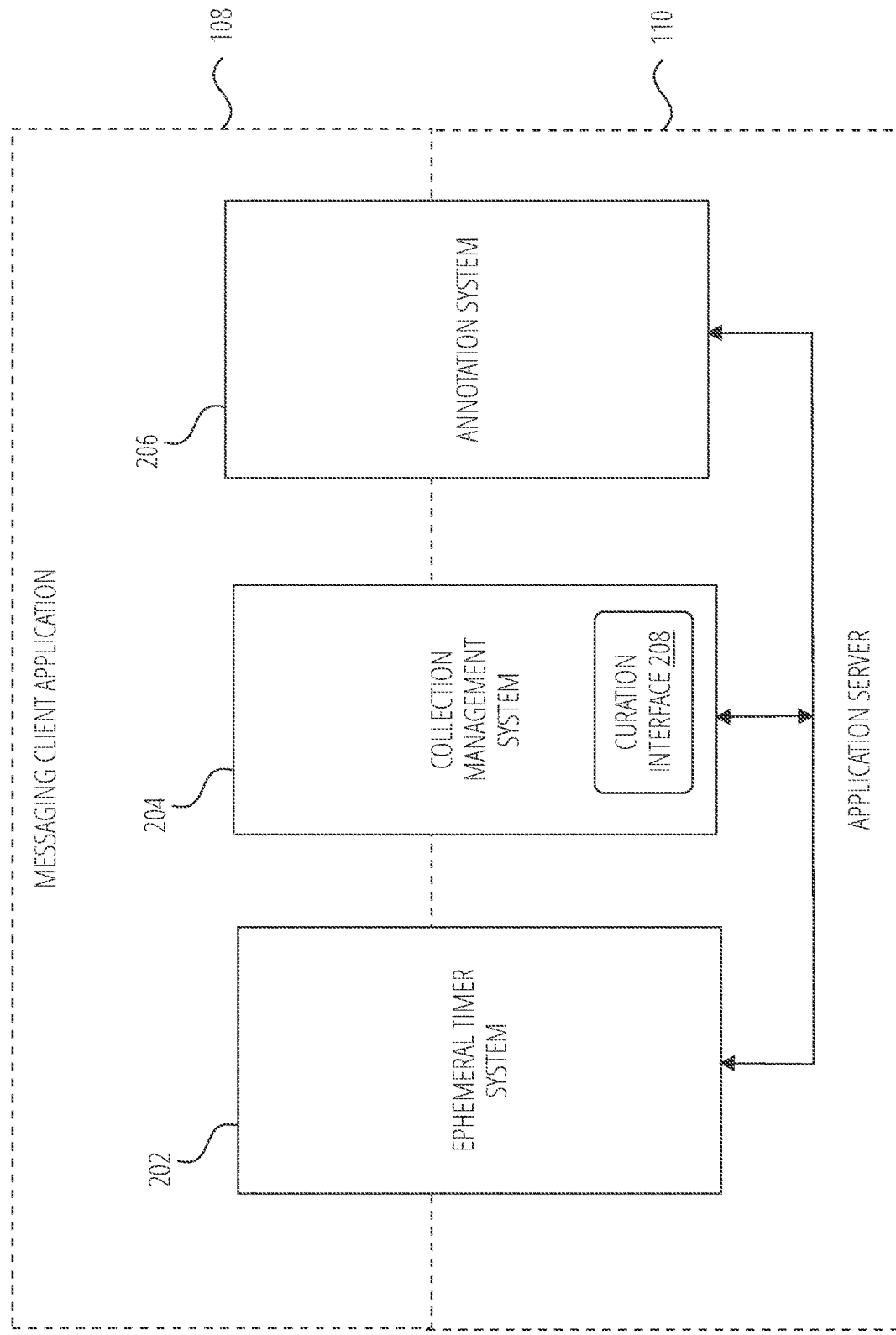
FIG. 2 is a diagrammatic representation of a messaging client application, in accordance with some example embodiments.

FIG. 2 is block diagram illustrating further details regarding the messaging system 100, according to example embodiments. Specifically, the messaging system 100 is shown to comprise the messaging client application 108 and the application server 110, which in turn embody a number of some subsystems, namely an ephemeral timer system 202, a collection management system 204 and an annotation system 206.

The ephemeral timer system 202 is responsible for enforcing the temporary access to content permitted by the messaging client application 108 and the messaging server application 114. To this end, the ephemeral timer system 202 incorporates a number of timers that, based on duration and display parameters associated with a message, or collection of messages (e.g., a story), selectively display and enable access to messages and associated content via the messaging client application 108. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 108.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay or supplementation (e.g., an image filter) to the messaging client application 108 based on a geolocation of the client device 106. In another example, the annotation system 206 operatively supplies a media overlay to the messaging client application 108 based on other information, such as social network information of the user of the client device 106. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 106. For example, the media overlay may include text that can be overlaid on top of a photograph taken by the client device 106. In another example, the media overlay includes an identification of a location overlay (e.g., Venice beach), a name of a live event, or a name of a merchant overlay (e.g., Beach Coffee House). In another example, the annotation system 206 uses the geolocation of the client device 106 to identify a media overlay that includes the name of a merchant at the geolocation of the client device 106. The media overlay may include other indicia associated with the merchant. The media overlays may be stored in the database 124 and accessed through the database server 116.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time.

FIG. 3 is a schematic diagram illustrating data structures 300 which may be stored in the database 124 of the messaging server system 104, according to certain example embodiments. While the content of the database 124 is shown to comprise a number of tables, it will be appreciated that the data could be stored in other types of data structures (e.g., as an object-oriented database).

The database 124 includes message data stored within a message table 302. The entity table 308 stores entity data, including an entity graph 314. Entities for which records are maintained within the entity table 308 may include individuals, corporate entities, organizations, objects, places, events, etc. Regardless of type, any entity regarding which the messaging server system 104 stores data may be a recognized entity. Each entity is provided with a unique identifier, as well as an entity type identifier (not shown).

The entity graph 314 furthermore stores information regarding relationships and associations between entities. Such relationships may be social, professional (e.g., work at a common corporation or organization) interested-based or activity-based, merely for example.

The database 124 also stores annotation data, in the example form of filters, in an annotation table 316. Filters for which data is stored within the annotation table 316 are associated with and applied to videos (for which data is stored in a video table 304) and/or images (for which data is stored in an image table 318). Filters, in one example, are overlays that are displayed as overlaid on an image or video during presentation to a recipient user. Filters may be of varies types, including user-selected filters from a gallery of filters presented to a sending user by the messaging client application 108 when the sending user is composing a message. Other types of filters include geolocation filters (also known as geo-filters) which may be presented to a sending user based on geographic location. For example, geolocation filters specific to a neighborhood or special location may be presented within a user interface by the messaging client application 108, based on geolocation information determined by a GPS unit of the client device 106. Another type of filer is a data filer, which may be selectively presented to a sending user by the messaging client application 108, based on other inputs or information gathered by the client device 106 during the message creation process. Example of data filters include current temperature at a specific location, a current speed at which a sending user is traveling, battery life for a client device 106, or the current time.

Other annotation data that may be stored within the image table 318 is so-called "lens" data. A "lens" may be a real-time special effect and sound that may be added to an image or a video.

As mentioned above, the video table 304 stores video data which, in one embodiment, is associated with messages for which records are maintained within the message table 302. Similarly, the image table 318 stores image data associated with messages for which message data is stored in the entity table 308. The entity table 308 may associate various annotations from the annotation table 316 with various images and videos stored in the image table 318 and the video table 304.

A story table 320 stores data regarding collections of messages and associated image, video, or audio data, which are compiled into a collection (e.g., a story or a gallery). The creation of a particular collection may be initiated by a particular user (e.g., each user for which a record is maintained in the entity table 308). A user may create a "personal story" in the form of a collection of content that has been created and sent/broadcast by that user. To this end, the user interface of the messaging client application 108 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client application 108, to contribute content to a particular live story. The live story may be identified to the user by the messaging client application 108, based on his or her location. The end result is a "live story" told from a community perspective.

A further type of content collection is known as a "location story", which enables a user whose client device 106 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

The database 124 also stores a metadata table 306, segment table 312, and a segment state table 310. The metadata table 306 includes the metadata associated with the media content items. The metadata can be associated with the animation that is created by a content creator and the media content identifier. The media content item can include a plurality of media content segments that include the user's avatar. As the media content segments including the user's avatar are generated, the segment table 312 can store the media content segments. The segment state table 310 can store the segment state associated with each of the media content segments. For example, the segment state can indicate that a media content segment associated therewith is ready and available for transmission.

Figure 4:
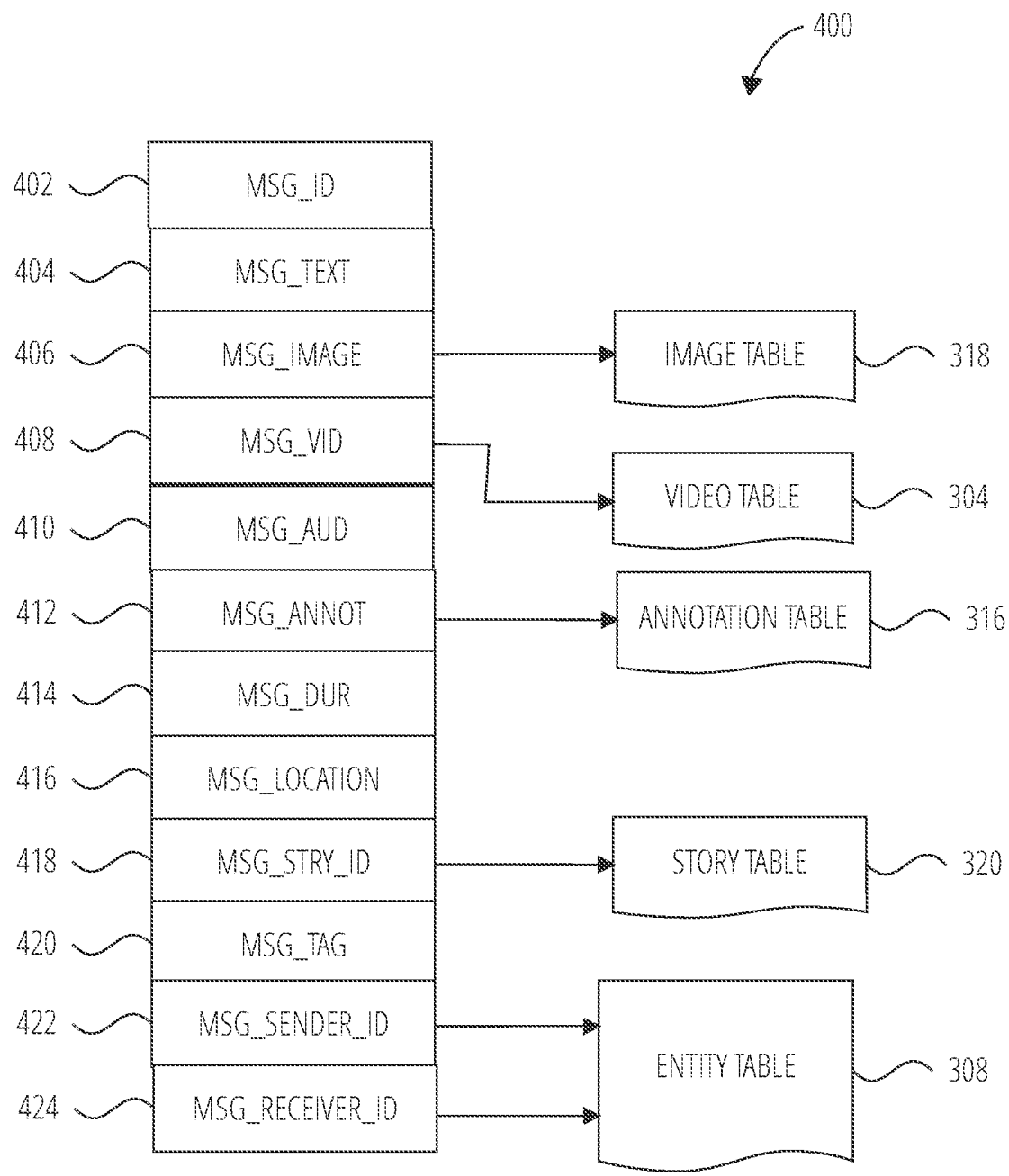
FIG. 4 is a diagrammatic representation of a message, in accordance with some example embodiments.

FIG. 4 is a schematic diagram illustrating a structure of a message 400, according to some in some embodiments, generated by a messaging client application 108 for communication to a further messaging client application 108 or the messaging server application 114. The content of a particular message 400 is used to populate the message table 302 stored within the database 124, accessible by the messaging server application 114. Similarly, the content of a message 400 is stored in memory as "in-transit" or "in-flight" data of the client device 106 or the application server 110. The message 400 is shown to include the following components:

A message identifier 402: a unique identifier that identifies the message 400.

A message text payload 404: text, to be generated by a user via a user interface of the client device 106 and that is included in the message 400.

A message image payload 406: image data, captured by a camera component of a client device 106 or retrieved from a memory component of a client device 106, and that is included in the message 400.

A message video payload 408: video data, captured by a camera component or retrieved from a memory component of the client device 106 and that is included in the message 400.

A message audio payload 410: audio data, captured by a microphone or retrieved from a memory component of the client device 106, and that is included in the message 400.

A message annotations 412: annotation data (e.g., filters, stickers or other enhancements) that represents annotations to be applied to message image payload 406, message video payload 408, or message audio payload 410 of the message 400.

A message duration parameter 414: parameter value indicating, in seconds, the amount of time for which content of the message (e.g., the message image payload 406, message video payload 408, message audio payload 410) is to be presented or made accessible to a user via the messaging client application 108.

A message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

A message story identifier 418: identifier values identifying one or more content collections (e.g., "stories") with which a particular content item in the message image payload 406 of the message 400 is associated. For example, multiple images within the message image payload 406 may each be associated with multiple content collections using identifier values.

A message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 106 on which the message 400 was generated and from which the message 400 was sent A message receiver identifier 424: an identifier (e.g., a messaging system identifier, email address, or device identifier) indicative of a user of the client device 106 to which the message 400 is addressed.

The contents (e.g., values) of the various components of message 400 may be pointers to locations in tables within which content data values are stored. For example, an image value in the message image payload 406 may be a pointer to (or address of) a location within an image table 318. Similarly, values within the message video payload 408 may point to data stored within a video table 304, values stored within the message annotations 412 may point to data stored in an annotation table 316, values stored within the message story identifier 418 may point to data stored in a story table 320, and values stored within the message sender identifier 422 and the message receiver identifier 424 may point to user records stored within an entity table 308.

FIG. 5 is a diagrammatic representation of the details 500 of the networked environment in which the present disclosure may be deployed, in accordance with some example embodiments.

As shown in FIG. 5, the content controller system 122 comprising a Delivery server system 502 and a Rendering server system 504 is communicatively coupled with the client device 106 and the segment table 312, the segment state table 310, and the metadata table 306 of the database 124.

Content creators (e.g., animators) can upload new content periodically to the messaging server system 104 in FIG. 1. The content creators can upload the new content via an electronic device (e.g., client device 106) or new content can be uploaded by the messaging server system 104. The content can be in the form of a number of episodes in a series like a television series that is released periodically (e.g., daily, weekly, monthly, etc.). The media content item can be in the form of a video that includes an animation.

In one embodiment, the content controller system 122 receives a request for the new content (e.g., a media content item) from a client device 106. The content controller system 122 delivers the media content item to the client device 106 on demand by using a streaming playlist where the Delivery server system 502 coordinates with the Rendering server system 504 to progressively append newly-rendered media content item segments (e.g., 2-3 second video segments) at the end of the playlist.

In one embodiment, the Delivery server system 502 receives the request from the client device 106. The request can be sent to the Delivery server system 502 when the user of the client device 106 selects a selectable icon or link being displayed on the client device 106 that is associated with the media content item. FIG. 12 illustrates an example user interface 1200 being displayed on the client device 106. As shown FIG. 12, the user interface 1200 can be an electronic program guide including a number of episodes of a video program (e.g., similar to a television series) or single video (e.g., similar to a feature length movie). The portions of the electronic program guide in user interface 1200 can be selectable to cause the request for a media content item to be transmitted to the Delivery server system 502. For example, when the user selects the link "Night Court" in the user interface 1200, the request for the "Night Court" media content item is transmitted to the Delivery server system 502.

The request from the client device 106 can include request parameters such as, for example, a media content identification and the main user identification. The media content identification identifies the media content item that is requested to be viewed. The media content identification can be an episode identification (e.g., Night Court episode 1). The main user identification can be an identification of the user of the client device 106 that is requesting the media content item. The main user identification can also be the identification of the avatar that is associated with the user of the client device 106 making the request (e.g., a main user avatar identification). In one embodiment, the request from the client device 106 also includes the second user identification that is associated with a user of a different client device 106.

The Delivery server system 502 of the content controller system 122 can retrieve (or fetch) the states of the segments of the media content item from the segment state table 310. The Delivery server system 502 can retrieve the states of the segments using the media content identification and the main user identifier (and/or the second user identification). The Delivery server system 502 compiles a playlist with the latest available video segments (e.g., media content item segments). In one embodiment, when each of the of the media content item segments is available, the Rendering server system 504 updates the state of the segment in the segment state table 310 to indicate that the segment is available.

The content controller system 122 can transmit to the client device 106 the playlist that includes a first set of media content segments. In one embodiment, the Delivery server system 502 transmits the playlist including the first set of media content segments to the client device 106. The first set of media content segments can include the introduction video portion of the media content item. The introduction video portion can be the first few video segments (e.g., 3 video segments) of the media content item. The introduction video portion can be, for example, 6-10 seconds of static introduction video. The set of media content item segments can also be a plurality of frames included in the media content item.

While the first set of media content item segments are being displayed, the Delivery server system 502 can also signal to the Rendering server system 504 to start rendering the subsequent set of media content item segments (e.g., the second set of media content item segments) which causes the Rendering server system 504 to start the rendering. The second set of media content items can be for example the next 3 segments after the introduction video portion. In one embodiment, while the first set of media content item segments are being displayed, the Rendering server system 504 renders a second set of media content item segments using the media content identification and the main user identification.

In one embodiment, the Rendering server system 504 retrieves (or fetches) and processes metadata from the metadata table 306 into the second set of media content item segments. The metadata can be for example metadata associated with the media content item identifier (e.g., episode metadata) which is needed to render the requested video segments. The metadata can be packaged as one large file per episode such that the Rendering server system 504 processes the metadata by cutting the file into a plurality of windows of frames to render the respective segments. Once rendered, the Rendering server system 504 stores the second set of media content item segments in the segment table 312. The sets of media content item segments stored in the segment table 312 can be in .ts files format. In one embodiment, the Rendering server system 504 can render the second set of media content item segments by rendering a main user avatar based on the main user identification and incorporating the main user avatar into the second set of media content segments.

Figure 13:
FIG. 13 illustrates an example of a frame 1300 of the media content item being displayed by the client device in accordance with one embodiment.
Figure 14:
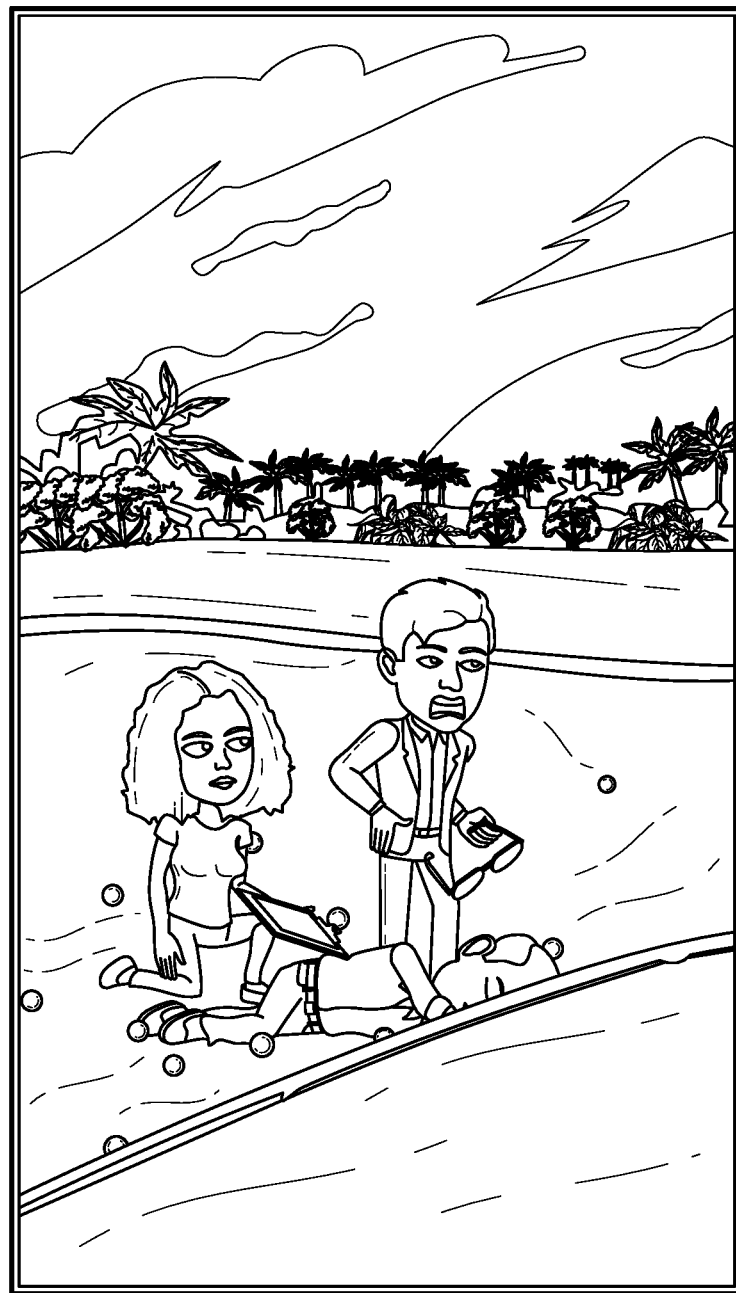
FIG. 14 illustrates an example of a frame 1400 of the media content item being displayed by the client device in accordance with one embodiment.

FIG. 13 and FIG. 14 illustrates examples of different frames of the media content item being displayed on the user interface of the client device 106 according to some embodiments of the present invention. As shown in the frames 1300 and 1400, the avatar associated with the user of the client device 106 can be incorporated into the media content item. For example, the frames 1300 and 1400 can be frames of an animated episode of a television series. The frames 1300 and 1400 can include a recurring character in the series (e.g., an avatar cast member) and also include an avatar that are associated with the user of the client device 106 and/or an avatar associated with the friends or contacts of the user of the client device 106 on the social network system 120. Accordingly, the episodes in the series can feature the user of the client device 106's avatar as well as the user's friend's avatars. By using the main user identification and the second user's identification (e.g., user of a different client device 106 that is a connection), the Rendering server system 504 can retrieve the most up-to-date version of the avatars to be incorporated into the media content item segments.

The Rendering server system 504 can also update the segment state table 310 by updating the state associated with the second set of media content item segments to indicate that the second set of media content item segments are available to be processed by the Delivery server system 502. The next time the client device 106 attempts to refresh the playlist, the Delivery server system 502 can pick up the change of the state of the next available set of media content item segments (e.g., the second set of media content item segments) and compile a new playlist. In one embodiment, the Rendering server system 504 can update the playlist to include the second set of media content items segments. The Delivery server system 502 can transmit the updated playlist to the client device 106.

This process is repeated by the Delivery server system 502 and the Rendering server system 504 until it is determined that the media content item is completely rendered. For example, once the Delivery server system 502 and/or the Rendering server system 504 determines that all the sets of media content item segments in the media content item are rendered, the playlist is no longer updated and the client device 106 will have displayed the entire media content item.

Although the following flowcharts can describe the operations as a sequential process, many of the operations can be performed in parallel or concurrently. In addition, the order of the operations may be re-arranged. A process is terminated when its operations are completed. A process may correspond to a method, a procedure, etc. The steps of methods may be performed in whole or in part, may be performed in conjunction with some or all of the steps in other methods, and may be performed by any number of different systems, such as the systems described in FIG. 1, FIG. 5, FIG. 15, FIG. 16, and/or FIG. 17, or any portion thereof, such as a processor included in any of the systems.

Figure 6:
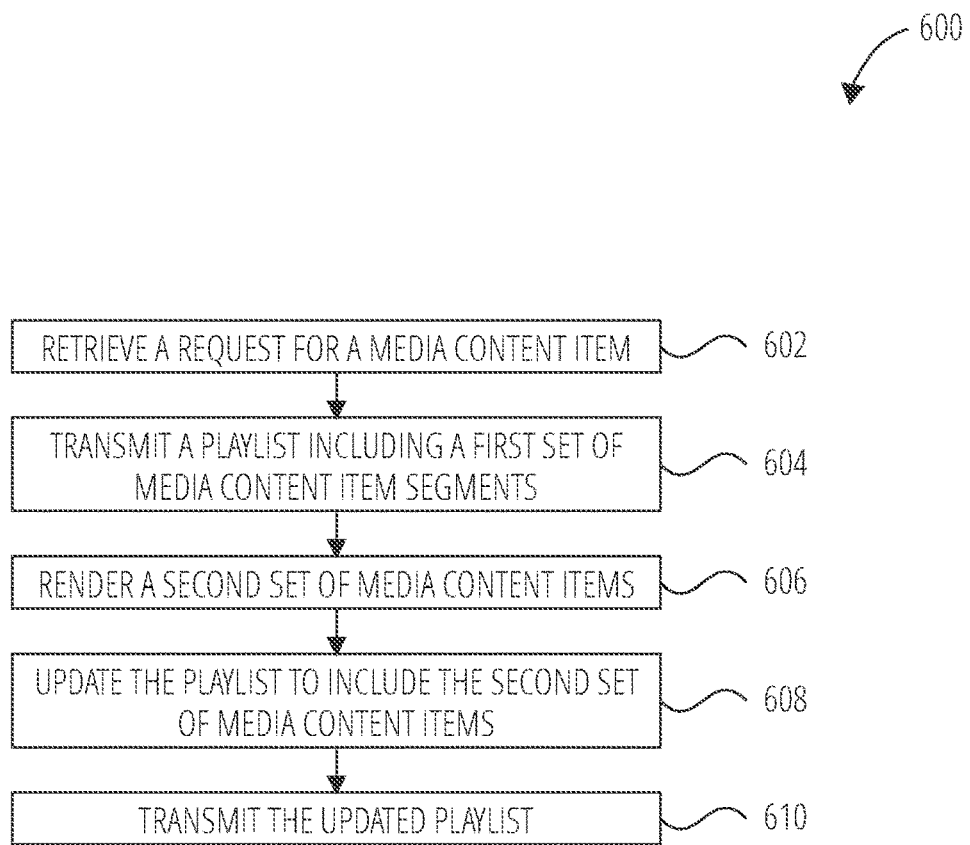
FIG. 6 illustrates a flowchart of a process for rendering video on demand, in accordance with one embodiment.

FIG. 6 illustrates a flowchart of a process 600 for rendering video on demand, in accordance with one embodiment. In operation 602, the delivery server system 502 of the content controller system 122 receives a request for a media content item from a client device 106. The request can comprise a media content identification and a main user identification. In one embodiment, the media content item is a video that is associated with the media content identification and the main user identification is associated with a user of the client device 106.

In operation 604, the delivery server system 502 transmits a playlist including a first set of media content item segments to the client device 106. The first set of media content item segments can be an introduction video portion of the media content item. In one embodiment, the content controller system 122 causes the first set of media content item segments to be displayed on the client device 106.

While the first set of media content item segments are being displayed on a display of the client device 106, at operation 606, the rendering server system 504 of the content controller system 122 renders a second set of media content item segments using the media content identification and the main user identification. The rendering server system 504 can upload the second set of media content item segments to a storage. For example, the rendering server system 504 can upload and store the second set of media content item segments to a segment table 312. The rendering server system 504 can also set a segment state to indicate that the storage (e.g., segment table 312) includes the second set of media content item segments for consumption by the client device 106. The rendering server system 504 can set the segment state that is stored in the segment state table 310 and that is associated with the second set of media content item segments.

At operation 608, the rendering server system 504 updates the playlist to include the second set of media content item segments. In one embodiment, the delivery server system 502 retrieves the segment states from the segment state table 310 and updates the playlist is based on the segment states.

At operation 610, the delivery server system 502 transmits the updated playlist to the client device 106. In one embodiment, while the first set of media content item segments are being displayed on the client device 106, the delivery server system 502 transmits the updated playlist to the client device 106.

Figure 7:
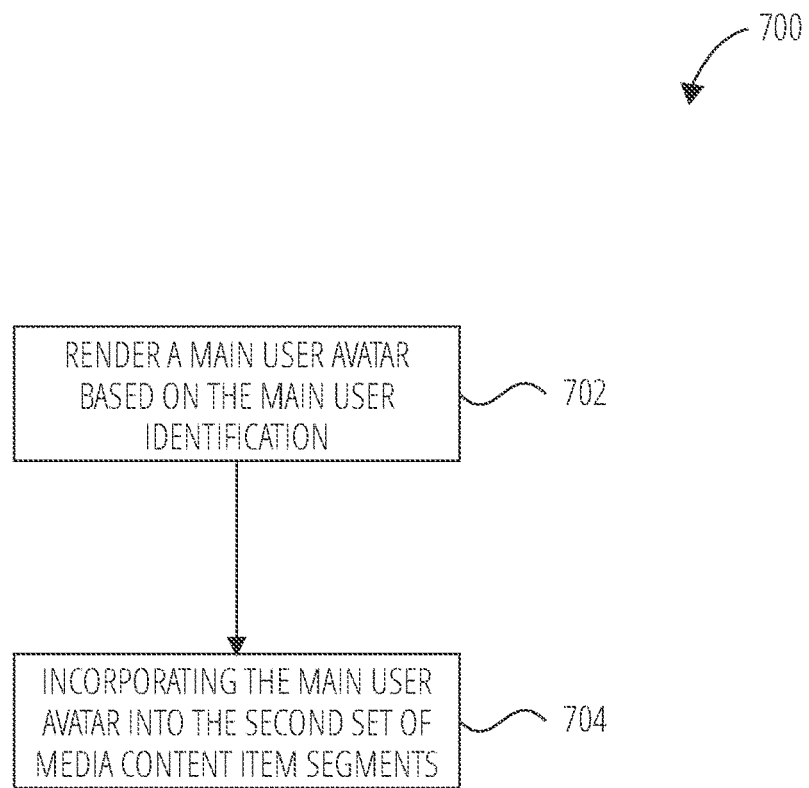
FIG. 7 illustrates a flowchart of a process for rendering the second set of media content item segments, in accordance with one embodiment.

FIG. 7 illustrates a flowchart of a process 700 for rendering of the second set of media content item segments (operation 606) in FIG. 6, in accordance with one embodiment. To render the second set of media content item segments, the rendering server system 504 can render a main user avatar based on the main user identification in operation 702. In operation 704, the rendering server system 504 can incorporate the main user avatar into the second set of media content item segments.

In one embodiment, the rendering server system 504 can also render the second set of media content item segments using a secondary user identification that is associated with a user (e.g., a second user) associated with a different client device 106. The second user can be a connection of the user (e.g., main user) of the client device 106 on the social network system 120. The second user can be, for example, a friend, a family member, or a contact of the main user on the social network system 120. The rendering server system 504 can render a secondary user avatar based on the secondary user identification, and incorporate the secondary user avatar into the second set of media content item segments.

In this embodiment, the rendering server system 504 generates media content item segments that include the avatar of the second user to be displayed on the main user's client device 106. Accordingly, the media content item that is being displayed for the main user of the client device 106 who requested the media content item can include at least one of the main user's avatar or his friend, family member or contact's avatar (e.g., second user) as stars of the episode.

Figure 8:
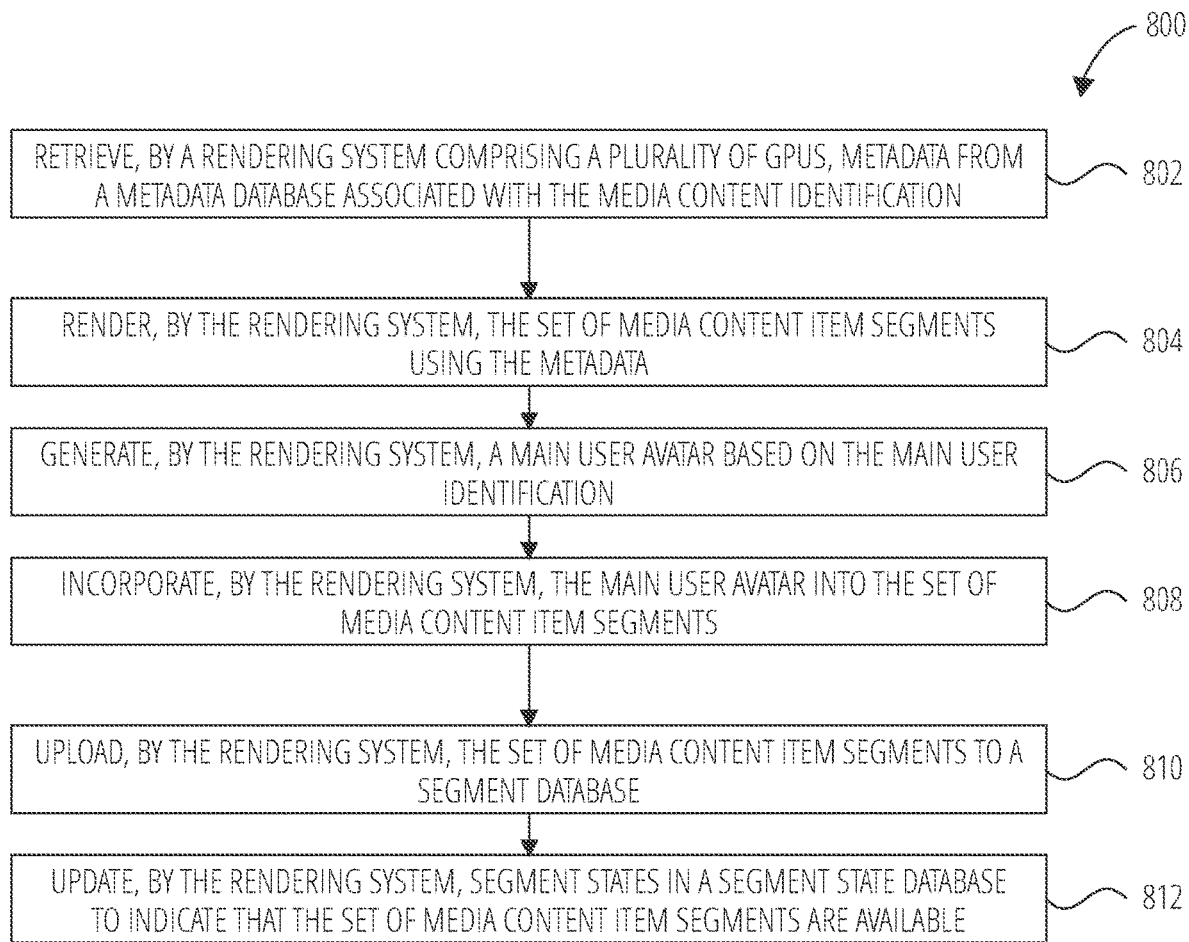
FIG. 8 illustrates a flowchart of a process for rendering the video on demand using a plurality of GPUs, in accordance with one embodiment.

FIG. 8 illustrates a flowchart of a process 800 for rendering the video on demand using a plurality of graphics processing units (GPUs), in accordance with one embodiment. To generate media content items for each requesting user on the messaging system 100 involves a significant number of renders and video encoding such that using GPU enabled instances can greatly accelerate the process of serving the media content items to the plurality client device 106.

The delivery server system 502 can receive a request for a media content item from a client device 106 that includes a media content identification and a main user identification. In one embodiment, the media content item is a video associated with the media content identification and the main user identification is associated with a user of the client device 106 (e.g., main user).

The rendering server system 504 in this embodiment comprises a plurality of GPUs to render a set of media content item segments using the media content identification and the main user identification. The set of media content item segments can be a plurality of frames included in the media content item. The plurality of GPUs included in the rendering server system 504 can be a fleet of GPUs that render the media content item segments, respectively.

To render the set of media content item segments, the rendering server system 504 can perform operations 802 to 808. At operation 802, the rendering server system 504 retrieves metadata from a metadata database (e.g., metadata table 306). The metadata that is retrieved is associated with the media content identification.

At operation 804, the rendering server system 504 renders the set of media content item segments using the metadata. At operation 806, the rendering server system 504 generates a main user avatar based on the main user identification. At operation 808, the rendering server system 504 incorporates the main user avatar into the set of media content item segments. The rendering server system 504 then uploads the set of media content item segments to a segment database (e.g., segment table 312) at operation 810. The segment states in the segment state table 310 indicate availability associated with media content item segments. At operation 812, the rendering server system 504 then updates segment states in a segment state database (e.g., segment state table 310) to indicate that the set of media content item segments are available.

The delivery server system 502 can retrieve the segment states from the segment state database (e.g., segment state table 310) and compile and transmit to the client device 106 a playlist including the set of media content item segments.

In one embodiment, when the delivery server system 502 receives the request for the media content item from the client device 106, the delivery server system 502 retrieves the segment states from the segment state database (e.g., segment state table 310) and compiles and transmits to the client device 106 a first set of media content item segments that is based on the segment states. For example, the first set of media content item segments can be the introduction video portion of the media content item. The delivery server system 502 then initializes the rendering of a second set of media content item segments.

In this embodiment, the rendering server system 504 comprising the plurality of GPUs renders a second set of media content item segments using the media content identification and the main user identification. The first set of media content item segments and the second set of media content item segments, respectively, are a plurality of frames included in the media content item. The first set of media content item segments can be sequential to the second set of media content item segments.

For example, the rendering server system 504 can render the second set of media content item segments by retrieving metadata from the metadata database (e.g., metadata table 306) associated with the media content identification, rendering the second set of media content item segments using the metadata, generating a main user avatar based on the main user identification, and incorporating the main user avatar into the second set of media content item segments. The rendering server system 504 can then upload the second set of media content item segments to a segment database (e.g., segment table 312) and update the segment states in the segment state database (e.g., segment state table 310) to indicate that the second set of media content item segments are available.

The delivery server system 502, in this embodiment, can update the playlist to include the second set of media content item segments. The delivery server system 502 can update the playlist by compiling the updated playlist to include the second set of media content item segments, and transmit the updated playlist to the client device 106. In one embodiment, the client device 106 receives the second set of media content item segments from the segment database.

Figure 9:
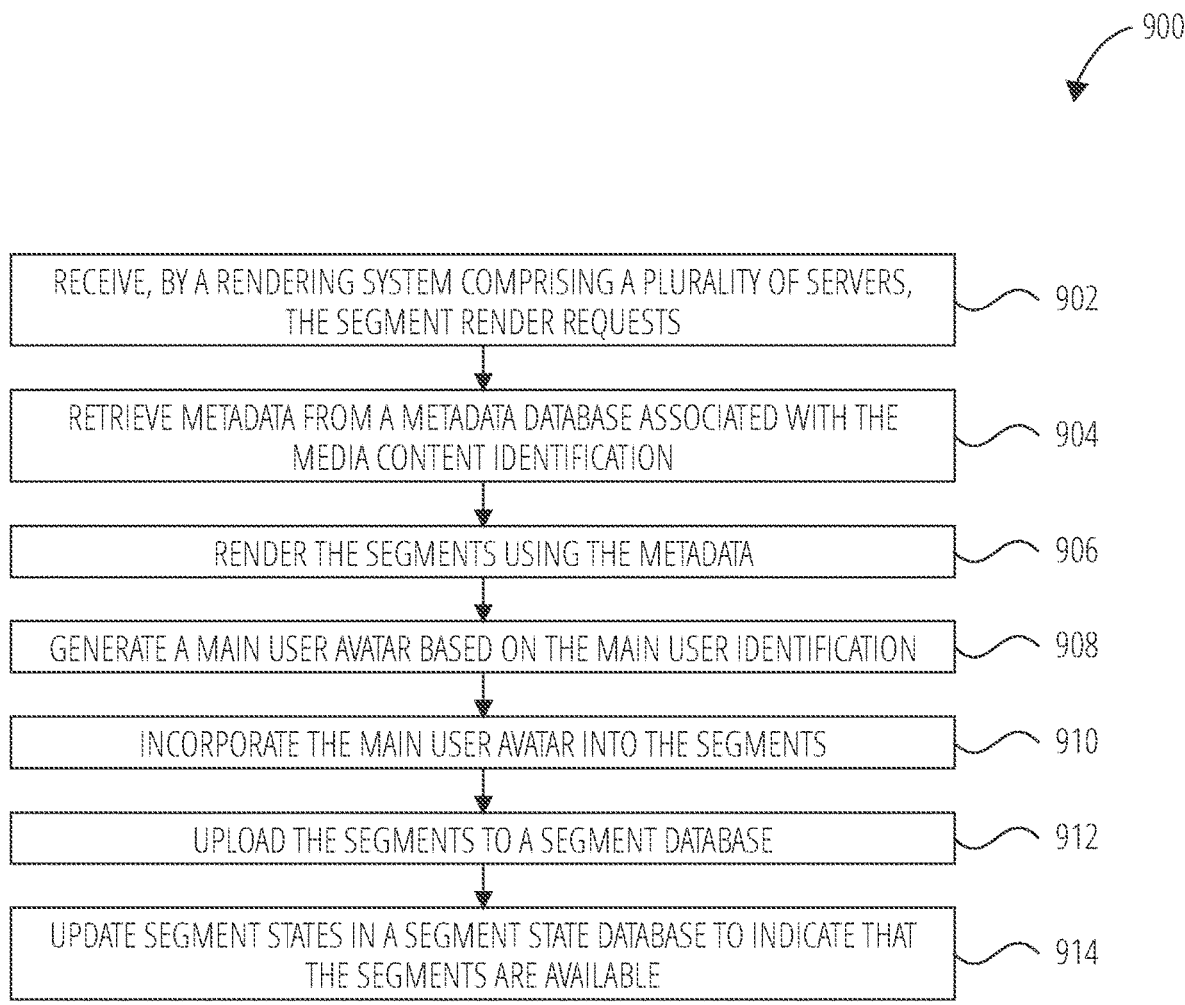
FIG. 9 illustrates a flowchart of a process for rendering the video on demand using a plurality of servers, in accordance with one embodiment.

FIG. 9 illustrates a flowchart of a process 900 for rendering the video on demand using a plurality of servers, in accordance with one embodiment. To generate media content items for each requesting user on the messaging system 100 involves a significant number of renders and video encoding such that a fleet of servers to generate segments in a media content item, respectively, can greatly accelerate the process of serving the media content items to the plurality client device 106. Each of the servers in the plurality of servers can perform operations simultaneously or sequentially.

In one embodiment, the process 900 starts at operation 902 with the rendering server system 504 that comprises the plurality of servers receiving a plurality of segment render requests. The segment render requests can correspond respectively to segments included in a set of media content item segments. The set of media content item segments are a plurality of frames included in a media content item. The media content item can be a video associated with the media content identification.

The rendering server system 504 renders the segments corresponding to the segment render requests using a media content identification and a main user identification. The main user identification is associated with a user of the client device 106.

In one embodiment, the rendering server system 504 can render the segments by performing operations 904 to 910. At operation 904, the rendering server system 504 retrieves metadata from a metadata database (e.g., metadata table 306) associated with the media content identification. At operation 906, the rendering server system 504 renders the segments using the metadata. At operation 908, the rendering server system 504 generates a main user avatar based on the main user identification. At operation 910, the rendering server system 504 incorporates the main user avatar into the segments.

At operation 912, the rendering server system 504 uploads the segments to a segment database (e.g., segment table 312). At operation 914, the rendering server system 504 updates segment states in a segment state database (e.g., segment state table 310) to indicate that the segments are available.

In one embodiment, the content controller system 122 can include a delivery server system 502 and a rendering server system 504 that comprises a plurality of servers. In one embodiment, the delivery server system 502 receives a request for a media content item from a client device 106. The request includes a media content identification and a main user identification. The delivery server system 502 retrieve segment states from a segment state database (e.g., segment state table 310) that indicates the availability associated with media content item segments. The delivery server system 502 compiles and transmits to the client device 106 a playlist including a first set of media content item segments. The first set of media content item segments is based on the segment states. The delivery server system 502 initializes rendering of a second set of media content item segments by generating a plurality of segment render requests. In one embodiment, the segment render requests correspond respectively to segments included in the second set of media content item segments. The first set of media content item segments can be sequential to the second set of media content item segments.

In one embodiment, the plurality of servers in the rendering server system 504 respectively receive the segment render requests and respectively render the segments corresponding to the segment render requests using the media content identification and the main user identification.

As illustrated in the FIG. 9, each of the plurality of servers can render the segments by retrieving metadata from a metadata database associated with the media content identification (operation 904), render the segments using the metadata (operation 906), generate a main user avatar based on the main user identification (operation 908), and incorporate the main user avatar into the segments (operation 910). The plurality of servers in the rendering server system 504 can then upload the segments to a segment database (operation 912), and update segment states in a segment state database to indicate that the segments are available (operation 914). In one embodiment, the delivery server system 502 is further to retrieve the segment states from the segment state database (e.g., segment state table 310).

In one embodiment, the delivery server system 502 collects the segments and to generate the second set of media content item segments. The delivery server system 502 can encode the second set of media content item segments into a video. In one embodiment, the delivery server system 502 updates the playlist to include the second set of media content item segments. The delivery server system 502 can updating the playlist by compiling the updated playlist to include the second set of media content item segments and by transmitting the updated playlist to the client device 106.

Figure 10:
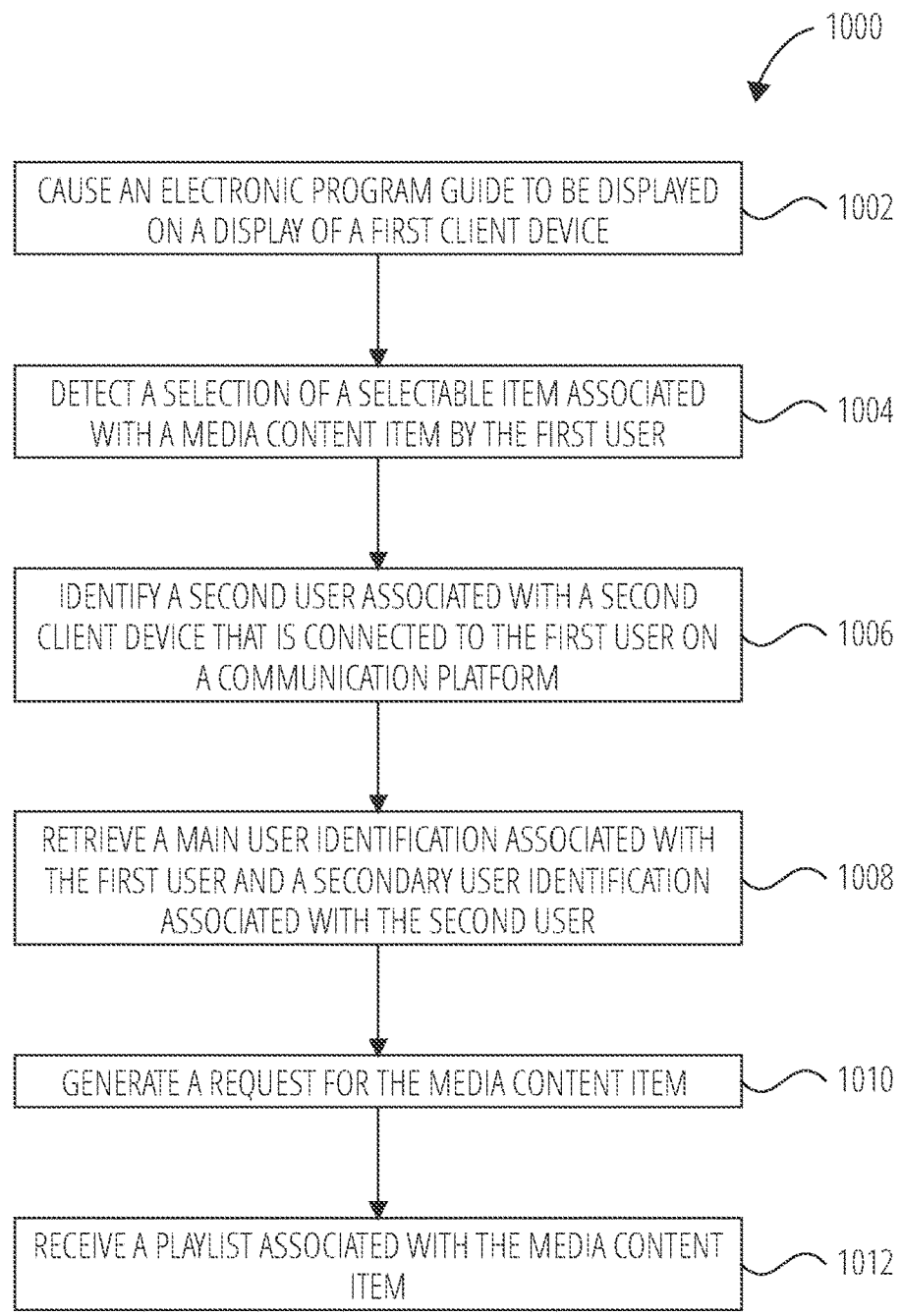
FIG. 10 illustrates a flowchart of a process for selecting the avatars to be included in a video being generated on demand, in accordance with one embodiment.

Given that the media content items are personalized to feature the main user's avatar and/or another user's avatar who is connected to the main user (e.g., user requesting the media content item) on the messaging system 100, a determination needs to be made regarding which avatars are to be incorporated into the media content item. FIG. 10 illustrates a flowchart of the process 1000 for selecting the avatars to be included in a video being generated on demand, in accordance with one embodiment.

The following process 1000 may be performed by any number of different systems, such as the content controller system 122 and/or the client device 106, or any portion thereof, such as a processor included in any of the systems or devices.

At operation 1002 of process 1000, a processor can cause an electronic program guide to be displayed on a display of a first client device 106. The first client device 106 is associated with a first user (e.g., main user) being associated with a first avatar. FIG. 12 illustrates an example of a user interface 1200 being displayed by the client device 106 in accordance with one embodiment. The user interface 1200 can be an example of the electronic program guide that includes selectable items (e.g., texts, images, links or icons) that are associated with a plurality of media content items.

At operation 1004, the processor detects a selection of a selectable item associated with a media content item by the first user. For example, the processor can detect that the user has selected the selectable item associated with "Golden Girls" media content item by selecting the area around the "Golden Girls" text via a touch screen or display device of the client device 106.

At operation 1006, the processor identifies a second user associated with a second client device 106 that is connected to the first user on a communication platform (e.g., messaging system 100). The second user can be a friend, family member, connection, or contact on the communication platform. In one embodiment, the second user can be based on the timing of the last communication with the first user on the messaging system 100. In this embodiment, the processor can identify the second user by identifying a user that most recently transmitted an electronic message to the first client device 106. The processor can also identify the second user by identifying a user that transmitted an electronic message to the first client device 106 within a predetermined period of time.

In some instances, the processor needs to select a second user based on whether the user has created a personalized avatar for the messaging system 100. To ensure that the second user has an avatar that can be used for the rendering of the media content item, the processor can identify a second user by identifying a user that is associated with the first user on the communication platform (e.g., messaging system 100) that is associated with an avatar. The processor can also select a second user based on both the timing of the last communication between the user and the first user as well as whether the user is associated with an avatar. In this embodiment, the processor identifies the second user by determining whether the user that transmitted the electronic message to the first client device 106 within the predetermined period of time is associated with an avatar.

In one embodiment, if the processor determines that no user that is associated with the first user on the communication platform (e.g., messaging system 100) is associated with an avatar, the processor selects the generic second user and indicates that a generic avatar should be used as the second avatar. In another embodiment, the processor can select a second user that is a contact of the first user on the messaging system 100 but assigns the generic avatar to that contact.

The processor can, at operation 1008, retrieve a main user identification associated with the first user and a secondary user identification associated with the second user. The second user is associated with a second avatar.

At operation 1010, the processor generates a request for the media content item. The request can include a media content identification associated with the media content item, the main user identification, and the secondary user identification.

At operation 1012, the processor receives a playlist associated with the media content item. The playlist includes a plurality of media content item segments that include the first avatar and the second avatar. FIG. 13 and FIG. 14 illustrate examples of frames (e.g., frame 1300 and frame 1400) of the media content item being displayed by the client device 106 that can include the first avatar and the second avatar, in accordance with one embodiment.

In one embodiment, the request for the media content item can be received by the processor of the content controller system 122 (e.g., delivery server system 502) and the processor of the content controller system 122 (e.g., rendering server system 504) renders the media content item segments using the media content identification, the main user identification, and the secondary user identification. The processor of the content controller system 122 can render the media content item segments by rendering the first avatar based on the main user identification, rendering the second avatar based on the secondary user identification, and incorporating the first avatar and the second avatar into the media content item segments.

To further optimize the on-demand rendering of the media content items, the rendering server system 504 of the content controller system 122 can also include a puppet animation system, an avatar matching system, or a combination thereof.

The puppet animation system receives an animation input from a client device 106 of a content creator. The content creator is the author of the media content items (e.g., the animator). The animation input can include the software, code, or art that is used to generate an animation file used to create the media content item. The puppet animation system generates an animation file including metadata (e.g., first metadata) based on the animation input. The animation file is associated with a media content identification. Accordingly, the animation file can include placeholder puppets that are animated based on the animation input. These placeholder puppets can include cast characters and swapper characters. The cast characters are characters in the animation that will appear in each rendering of the animation for viewing by client devices 106 while the swapper characters are characters that will be swapped for the avatar of the main user (first avatar) and/or the avatar of the second user (second avatar) when the animation is rendered for viewing at a client device 106.

In one embodiment, the rendering server system 504 renders the media content items using the metadata based on the animation input (e.g., first metadata) and the metadata (e.g., second metadata) associated with an avatar's body pose or positioning, the avatar's clothing, as well as the avatar's facial expression. While the puppet animation system generates the first metadata, the avatar matching system can generate the second metadata.

For example, a content creator provides animation input to the puppet animation system which generates the animation file including the first metadata. The animation file includes the placeholder puppets that are animated based on the animation input. In some examples, to provide further details to the animation or in order to be compatible with the avatars generated by the rendering server system 504, the second metadata associated with the placeholder puppets in each frame of the animation file may be needed.

Figure 11:
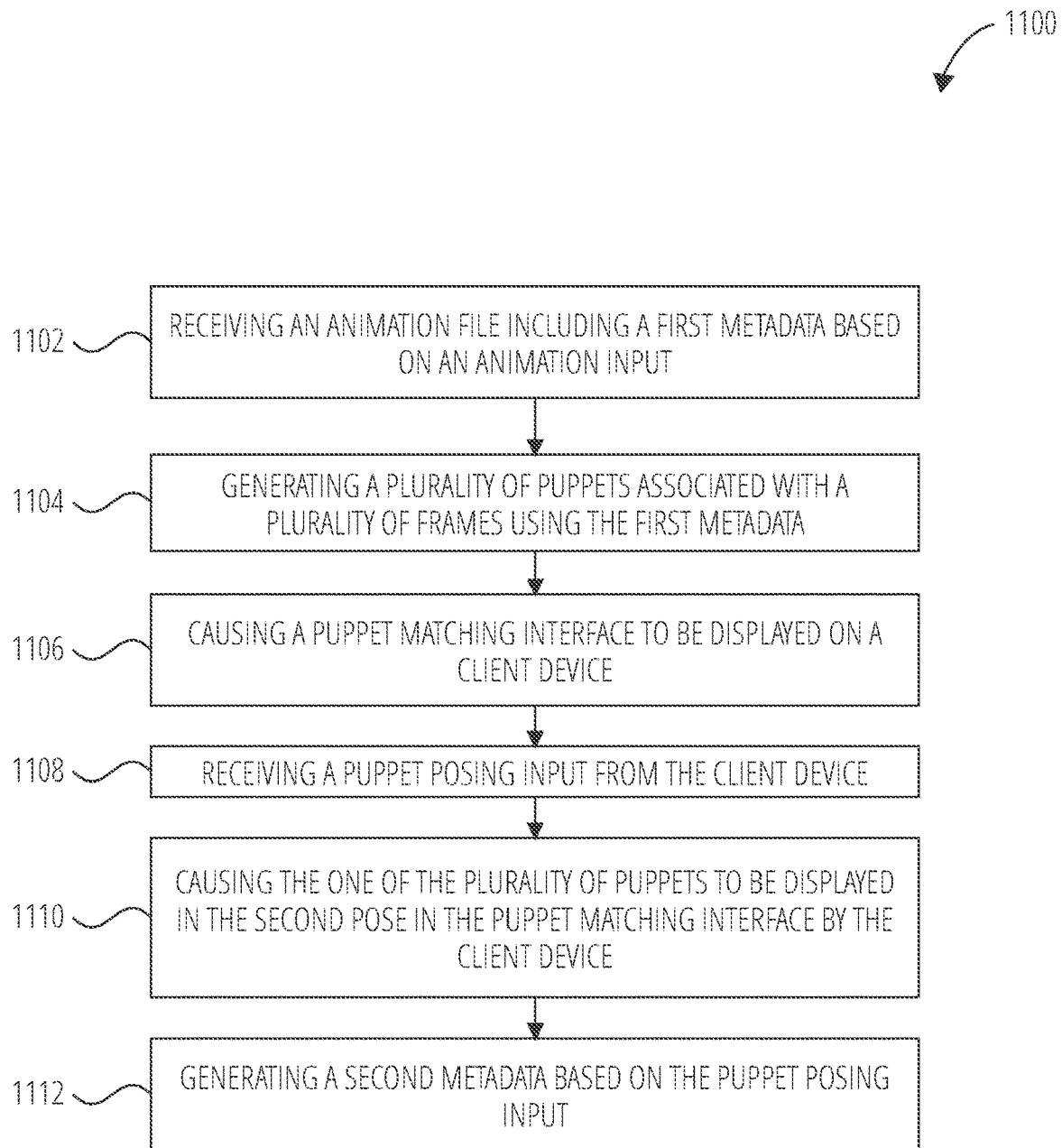
FIG. 11 illustrates a flowchart of a process for generating avatar posing metadata using an avatar matching system in accordance with one embodiment.

To facilitate the generation of the second metadata, the content creator can import the animation file or portions thereof into the avatar matching system. FIG. 11 provides an example of a process for generating avatar posing metadata (e.g., second metadata) using an avatar matching system in accordance with one embodiment.

The avatar matching system generate the plurality of (placeholder) puppets associated with a plurality of frames of the animation file using the first metadata. The avatar matching system causes the content creator's client device 106 to display a puppet matching interface that includes selectable items (e.g., links, icons, images, text) that correspond to each of the frames. For example, when the content creator selects a first selectable item associated with a first frame, the puppet in the first frame is caused to be displayed on the puppet matching interface. The content creator can manipulate the puppets in each frame by providing a puppet posing input via the puppet matching interface. For example, the content creator can manipulate the puppet's arm from bending at a right angle (e.g., first pose) to being extended at 180 degrees (e.g., second pose). The avatar matching system can cause the puppet to be displayed on the puppet matching interface in the second pose as well as cause the corresponding puppet in the puppet animation system to be displayed in the second pose. In one example, the avatar matching system generates a second metadata that is based on the puppet posing input and transmits the second metadata to the puppet animation system or to the metadata database.

Similarly, the avatar matching system can also receive a puppet posing input from the content creator that changes the puppet's clothing and accessories. The avatar matching system an generate the second metadata that is associated with the changed clothing and accessories. In another example, the avatar matching system can also provide the content creator the options to select a different body type for the puppet. For example, the body type options can include an average body type, a big body type and a small body type. When selecting the different body types, the content creator can manipulate the positioning of the puppets body to ensure that each body type is positioned appropriately in each frame. For example, if the puppet in a frame is holding an item at arm's length, the arms of a puppet with the average body type may result in the puppet be holding the item whereas the item may appear to be floating by the puppet with the big body type's forearm or elbow. Accordingly, in some embodiments, the content creator can manipulate the puppet for each body type in each frame to ensure that the positioning as desired. The avatar matching system can generate the second metadata for each body type of the puppet for each of the frames. Thus, in one example, the avatar matching system is generating a second metadata in the data layers of the puppet animation system to reflect the changes in each of the frames.

In one example, the rendering server system 504 can render a set of media content item segments using the media content identification. The rendering server system 504 can render the set of media content item segments by retrieving the first metadata and the second metadata from a metadata database associated with the media content identification, and rendering the set of media content item segments using the first metadata and second metadata.

The rendering server system 504 can receive a request for a media content item from a viewer client device 106. The viewer client device 106 is associated with a user that is requesting that the media content item be rendered for display at the viewer client device 106. The request can comprise the media content identification and the main user identification. The media content item can be a video associated with the media content identification. The main user identification can be associated with a user of the viewer client device 106.

The rendering server system 504 can render a set of media content item segments using the media content identification and the main user identification. In one embodiment, the rendering server system 504 renders the set of media content item segments by generating a main user avatar based on the main user identification, and incorporating the main user avatar into the set of media content item segments. The rendering server system 504 can also upload the set of media content item segments to a segment database and update segment states in the segment state database to indicate that the set of media content item segments are available.

In one embodiment, when the rendering server system 504 receives the request for the media content item, the rendering server system 504 can transmit to the viewer client device 106 a playlist including the set of media content item segments. The rendering server system 504 can also retrieve the segment states from the segment state database and update the playlist based on the segment states.

FIG. 11 illustrates a flowchart of a process for generating avatar posing metadata (e.g., second metadata) using an avatar matching system in accordance with one embodiment. The following process 1100 may be performed by any number of different systems, such as the content controller system 122 and/or the client device 106 of a content creator and/or a viewer client device 106, or any portion thereof, such as a processor included in any of the systems or devices.

At operation 1102, a processor receives an animation file including a first metadata based on an animation input. The animation file can be associated with a media content identification. In one example, the processor can receive the animation file from a puppet animation system. The puppet animation system can receive the animation input from a content creator's client device 106 and generates the animation file including the first metadata.

At operation 1104, the processor generates a plurality of puppets associated with a plurality of frames using the first metadata. The animation file comprises the plurality of frames.

At operation 1106, the processor causes a puppet matching interface to be displayed on a content creator's client device 106. The puppet matching interface includes one of the plurality of puppets in a first pose. The processor can receive a puppet posing input from the content creator's client device 106, at operation 1108. The puppet posing input is associated with a second pose.

At operation 1110, the processor causes the one of the plurality of puppets to be displayed in the second pose in the puppet matching interface by the content creator's client device 106. In one example, the processor can cause the puppet animation system to display an animation interface including the one of the plurality of puppets in the second pose. The animation interface can also be displayed on the content creator's client device 106.

At operation 1112, the processor generates a second metadata based on the puppet posing input. The processor can transmit the second metadata to the puppet animation system, or to the metadata database.

Figure 15:
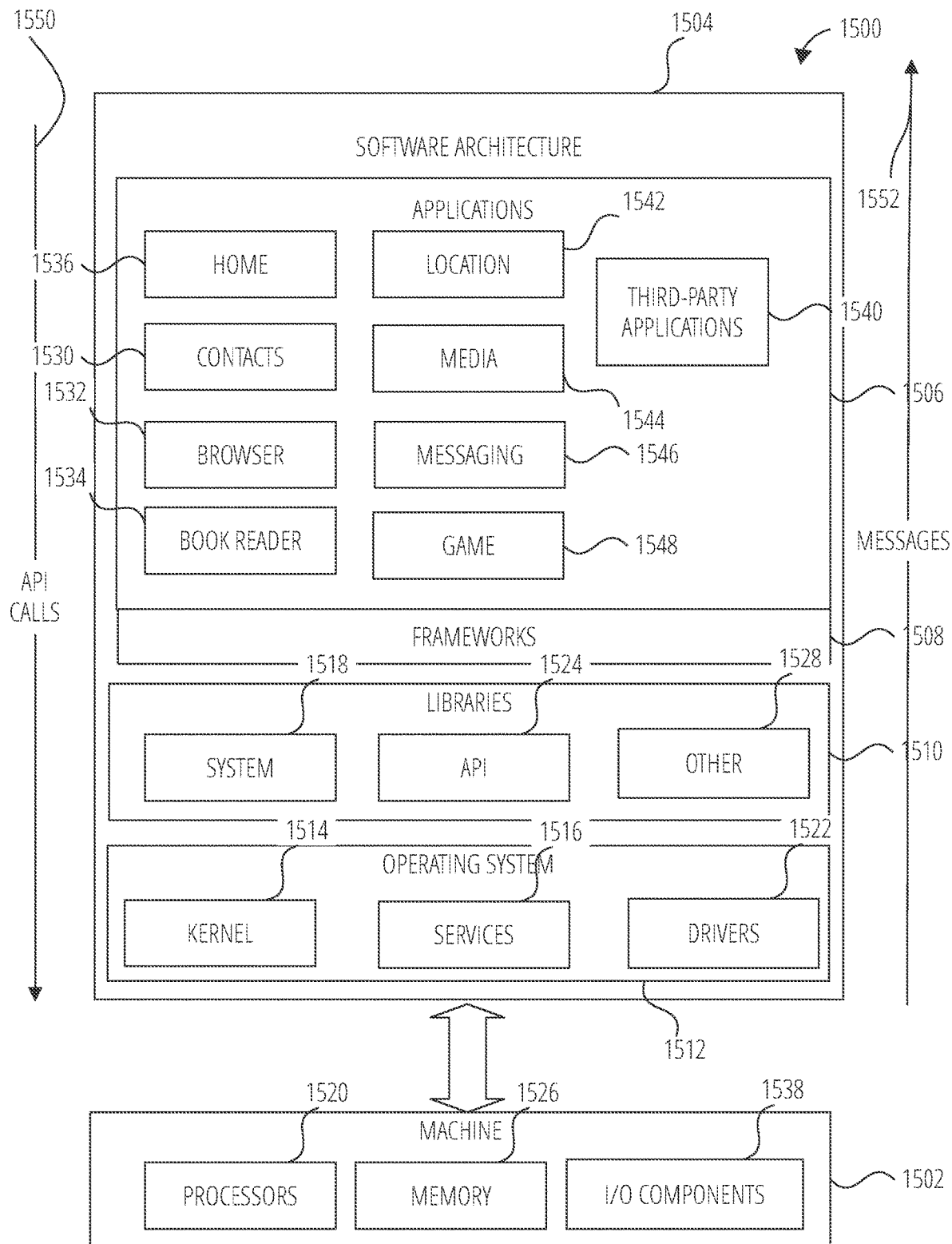
FIG. 15 is block diagram showing a software architecture within which the present disclosure may be implemented, in accordance with some example embodiments.

FIG. 15 is a block diagram 1500 illustrating a software architecture 1504, which can be installed on any one or more of the devices described herein. The software architecture 1504 is supported by hardware such as a machine 1502 that includes processors 1520, memory 1526, and I/O components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, processor management (e.g., scheduling), component management, networking, and security settings, among other functionality. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

The libraries 1510 provide a low-level common infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a high-level common infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example embodiment, the applications 1506 may include a home application 1536, a contacts application 1530, a browser application 1532, a book reader application 1534, a location application 1542, a media application 1544, a messaging application 1546, a game application 1548, and a broad assortment of other applications such as third-party applications 1540. The applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party applications 1540 (e.g., applications developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party applications 1540 can invoke the API calls 1550 provided by the operating system 1512 to facilitate functionality described herein.

Figure 16:
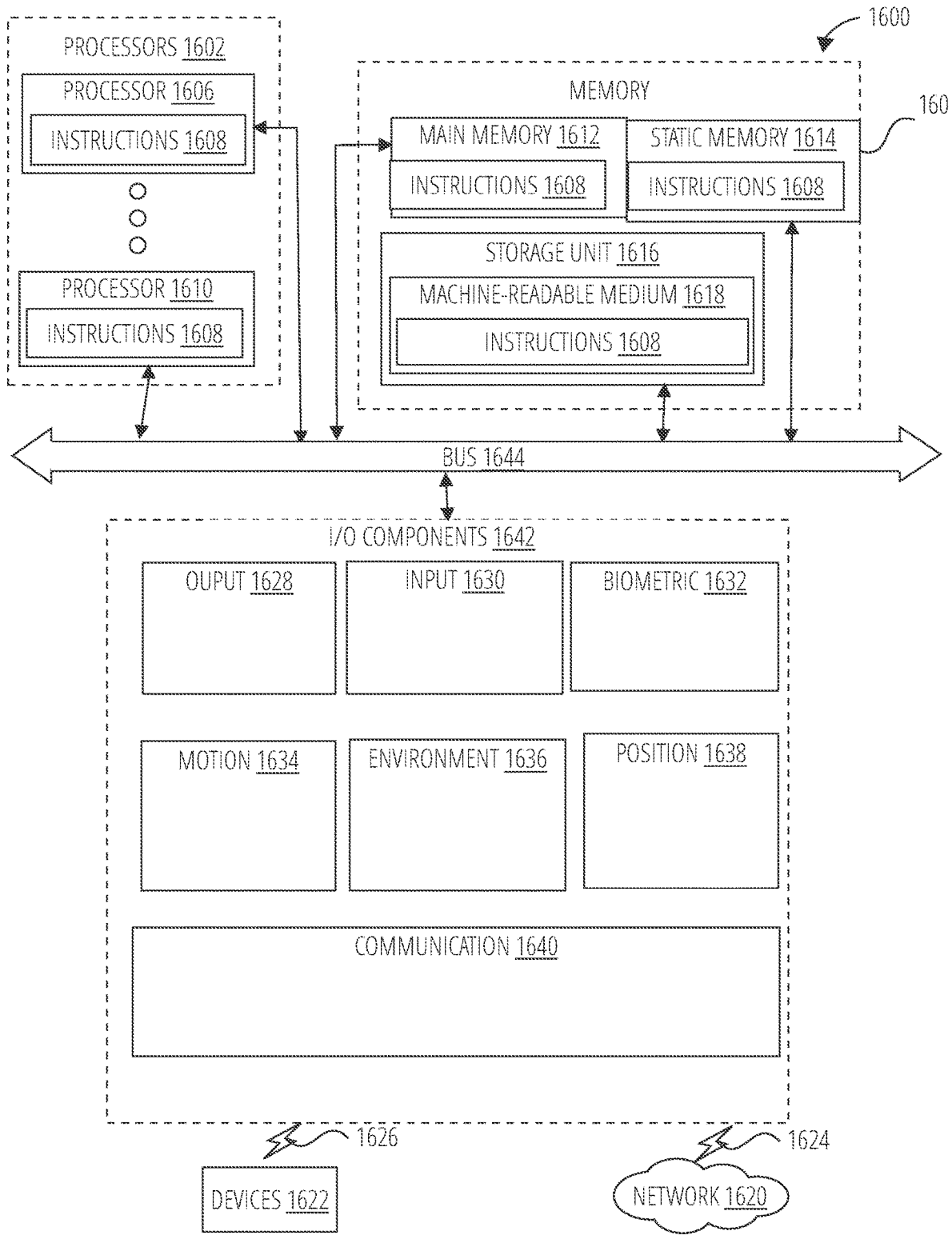
FIG. 16 is a diagrammatic representation of a machine, in the form of a computer system within which a set of instructions may be executed for causing the machine to perform any one or more of the methodologies discussed, in accordance with some example embodiments.

FIG. 16 is a diagrammatic representation of a machine 1600 within which instructions 1608 (e.g., software, a program, an application, an applet, an app, or other executable code) for causing the machine 1600 to perform any one or more of the methodologies discussed herein may be executed. For example, the instructions 1608 may cause the machine 1600 to execute any one or more of the methods described herein. The instructions 1608 transform the general, non-programmed machine 1600 into a particular machine 1600 programmed to carry out the described and illustrated functions in the manner described. The machine 1600 may operate as a standalone device or may be coupled (e.g., networked) to other machines. In a networked deployment, the machine 1600 may operate in the capacity of a server machine or a client machine in a server-client network environment, or as a peer machine in a peer-to-peer (or distributed) network environment. The machine 1600 may comprise, but not be limited to, a server computer, a client computer, a personal computer (PC), a tablet computer, a laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1608, sequentially or otherwise, that specify actions to be taken by the machine 1600. Further, while only a single machine 1600 is illustrated, the term "machine" shall also be taken to include a collection of machines that individually or jointly execute the instructions 1608 to perform any one or more of the methodologies discussed herein.

The machine 1600 may include processors 1602, memory 1604, and I/O components 1642, which may be configured to communicate with each other via a bus 1644. In an example embodiment, the processors 1602 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1606 and a processor 1610 that execute the instructions 1608. The term "processor" is intended to include multi-core processors that may comprise two or more independent processors (sometimes referred to as "cores") that may execute instructions contemporaneously. Although FIG. 16 shows multiple processors 1602, the machine 1600 may include a single processor with a single core, a single processor with multiple cores (e.g., a multi-core processor), multiple processors with a single core, multiple processors with multiples cores, or any combination thereof.

The memory 1604 includes a main memory 1612, a static memory 1614, and a storage unit 1616, both accessible to the processors 1602 via the bus 1644. The main memory 1604, the static memory 1614, and storage unit 1616 store the instructions 1608 embodying any one or more of the methodologies or functions described herein. The instructions 1608 may also reside, completely or partially, within the main memory 1612, within the static memory 1614, within machine-readable medium 1618 within the storage unit 1616, within at least one of the processors 1602 (e.g., within the processor's cache memory), or any suitable combination thereof, during execution thereof by the machine 1600.

The I/O components 1642 may include a wide variety of components to receive input, provide output, produce output, transmit information, exchange information, capture measurements, and so on. The specific I/O components 1642 that are included in a particular machine will depend on the type of machine. For example, portable machines such as mobile phones may include a touch input device or other such input mechanisms, while a headless server machine will likely not include such a touch input device. It will be appreciated that the I/O components 1642 may include many other components that are not shown in FIG. 16. In various example embodiments, the I/O components 1642 may include output components 1628 and input components 1630. The output components 1628 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1630 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1642 may include biometric components 1632, motion components 1634, environmental components 1636, or position components 1638, among a wide array of other components. For example, the biometric components 1632 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1634 include acceleration sensor components (e.g., accelerometer), gravitation sensor components, rotation sensor components (e.g., gyroscope), and so forth. The environmental components 1636 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1638 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1642 further include communication components 1640 operable to couple the machine 1600 to a network 1620 or devices 1622 via a coupling 1624 and a coupling 1626, respectively. For example, the communication components 1640 may include a network interface component or another suitable device to interface with the network 1620. In further examples, the communication components 1640 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1622 may be another machine or any of a wide variety of peripheral devices (e.g., a peripheral device coupled via a USB).

Moreover, the communication components 1640 may detect identifiers or include components operable to detect identifiers. For example, the communication components 1640 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1640, such as location via Internet Protocol (IP) geolocation, location via Wi-Fi® signal triangulation, location via detecting an NFC beacon signal that may indicate a particular location, and so forth.

The various memories (e.g., memory 1604, main memory 1612, static memory 1614, and/or memory of the processors 1602) and/or storage unit 1616 may store one or more sets of instructions and data structures (e.g., software) embodying or used by any one or more of the methodologies or functions described herein. These instructions (e.g., the instructions 1608), when executed by processors 1602, cause various operations to implement the disclosed embodiments.

The instructions 1608 may be transmitted or received over the network 1620, using a transmission medium, via a network interface device (e.g., a network interface component included in the communication components 1640) and using any one of a number of well-known transfer protocols (e.g., hypertext transfer protocol (HTTP)). Similarly, the instructions 1608 may be transmitted or received using a transmission medium via the coupling 1626 (e.g., a peer-to-peer coupling) to the devices 1622.

Figure 17:
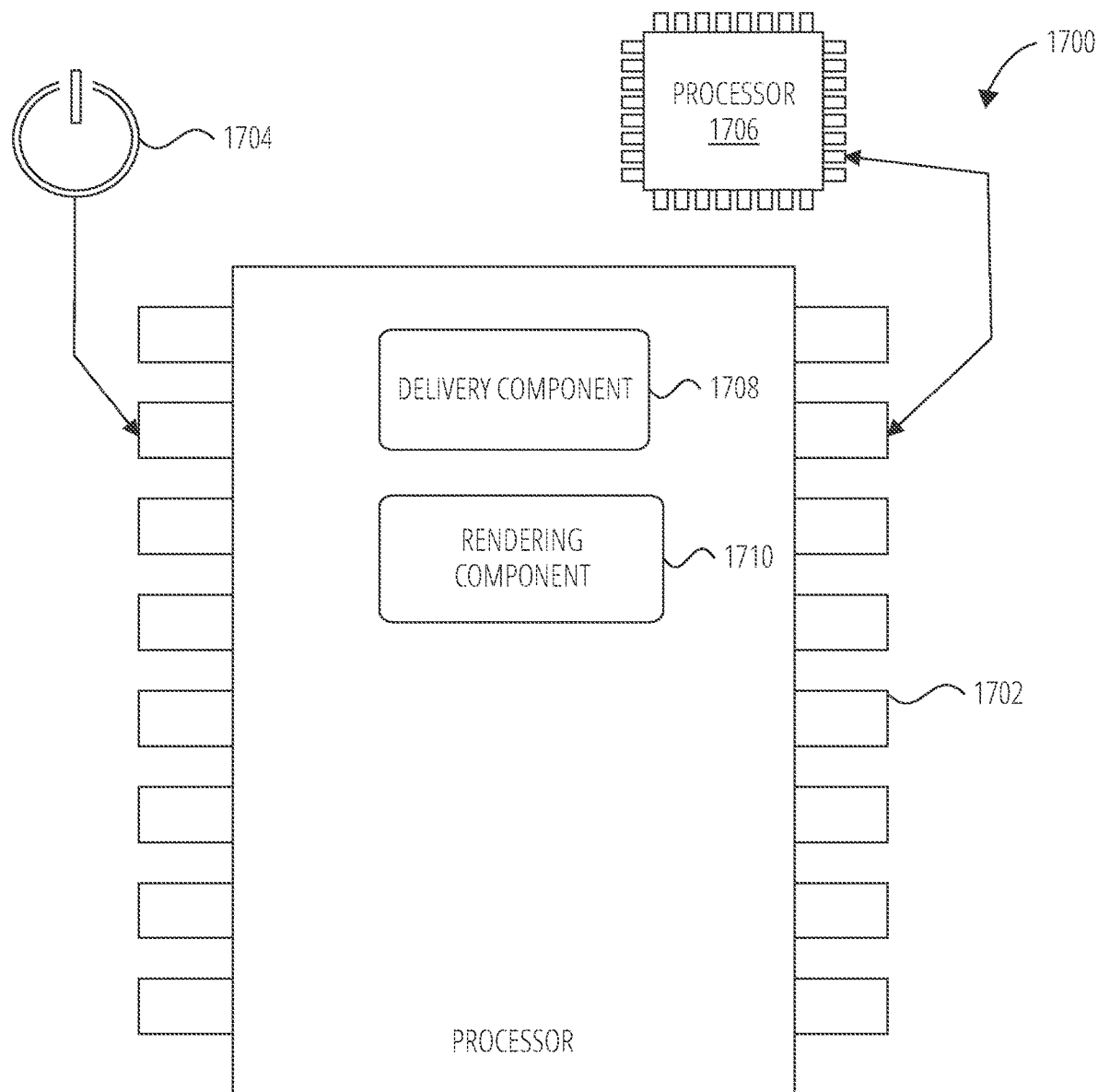
FIG. 17 is a diagrammatic representation of a processing environment, in accordance with some example embodiments.

Turning now to FIG. 17, there is shown a diagrammatic representation of a processing environment 1700, which includes the processor 1706 and a processor 1702 (e.g., a GPU, CPU or combination thereof).

The processor 1702 is shown to be coupled to a power source 1704, and to include (either permanently configured or temporarily instantiated) modules, namely a Delivery Component 1708 and a Rendering Component 1710. The Delivery Component 1708 operationally performs the operations of the delivery server system 502 such as processing the requests and delivery of the media content item, and the Rendering Component 1710 operationally performs the operations of the rendering server system 504 such as generating the segments of the media content items included in the playlist.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Changes and modifications may be made to the disclosed embodiments without departing from the scope of the present disclosure. These and other changes or modifications are intended to be included within the scope of the present disclosure, as expressed in the following claims.

What is claimed is:

1. An avatar matching system comprising:
 a processor; and
 a memory storing instructions thereon, when executed by the processor, causes the avatar matching system to perform operations comprising:
 receiving an animation file including a first metadata and a plurality of frames, wherein the animation file is based on an animation input from a client device,
 generating a plurality of puppets associated with the plurality of frames using the first metadata,
 causing a puppet matching interface to be displayed on the client device, wherein the puppet matching interface includes one of the plurality of puppets in a first pose,
 causing the one of the plurality of puppets to be displayed in a second pose in the puppet matching interface based on a puppet posing input, and
 generating a second metadata based on the puppet posing input.

2. The avatar matching system of claim 1, further comprising:
 receiving the puppet posing input from the client device, the puppet posing input being associated with the second pose.

3. The avatar matching system of claim 1, wherein the operations further comprise:
   transmitting the second metadata to a puppet animation system, or to a metadata database.

4. The avatar matching system of claim 1, wherein the operations further comprise:
   causing an animation interface to be displayed on the client device, wherein the animation interface includes the one of the plurality of puppets in the second pose.

5. A computer-readable storage medium having instructions stored thereon, when executed by a processor, causes the processor to perform operations comprising:
   receiving an animation file including a first metadata and a plurality of frames, wherein the animation file is based on an animation input from a client device,
   generating a plurality of puppets associated with the plurality of frames using the first metadata,
   causing a puppet matching interface to be displayed on the client device, wherein the puppet matching interface includes one of the plurality of puppets in a first pose,
   causing the one of the plurality of puppets to be displayed in a second pose in the puppet matching interface based on a puppet posing input, and
   generating a second metadata based on the puppet posing input.

6. The computer-readable storage medium of claim 5, wherein the processor to perform operations further comprising:
   receiving the puppet posing input from the client device, the puppet posing input being associated with the second pose.

7. The computer-readable storage medium of claim 5, wherein the processor to perform operations further comprising:
   transmitting the second metadata to a puppet animation system, or to a metadata database.

8. The computer-readable storage medium of claim 5, wherein the processor to perform operations further comprising:
   transmit to a metadata database the first metadata or the second metadata or a combination thereof.

9. The computer-readable storage medium of claim 5, wherein the processor to perform operations further comprising:
   causing an animation interface to be displayed on the client device, wherein the animation interface includes the one of the plurality of puppets in the second pose.

10. The computer-readable storage medium of claim 6, wherein the processor to perform operations further comprising:
    receiving a request for a media content item from a viewer client device, the request comprising a media content identification and a main user identification, wherein the animation file is associated with the media content identification.

11. The computer-readable storage medium of claim 10, wherein the processor to perform operations further comprising:
    rendering a set of media content item segments using the media content identification, wherein rendering the set of media content item segments comprises:
    retrieving the first metadata and the second metadata from a metadata database associated with the media content identification, and
    rendering the set of media content item segments using the first metadata and second metadata.

12. The computer-readable storage medium of claim 11, wherein the processor to perform operations further comprising:
    transmitting to the viewer client device a playlist including the set of media content item segments.

13. The computer-readable storage medium of claim 12, wherein the processor to perform operations further comprising:
    retrieving segment states from a segment state database.

14. The computer-readable storage medium of claim 13, wherein the processor to perform operations further comprising:
    updating the playlist based on the segment states.

15. The computer-readable storage medium of claim 10, wherein the main user identification is associated with a user of the viewer client device.

16. The computer-readable storage medium of claim 10, wherein the media content item is a video associated with the media content identification.

17. A method comprising:
    receiving, by a processor, an animation file including a first metadata and a plurality of frames, wherein the animation file is based on an animation input from a client device,
    generating a plurality of puppets associated with the plurality of frames using the first metadata,
    causing a puppet matching interface to be displayed on the client device, wherein the puppet matching interface includes one of the plurality of puppets in a first pose,
    causing the one of the plurality of puppets to be displayed in a second pose in the puppet matching interface based on a puppet posing input, and
    generating a second metadata based on the puppet posing input.

18. The method of claim 17, further comprising:
    receiving the puppet posing input from the client device, the puppet posing input being associated with the second pose.

19. The method of claim 17, further comprising:
    transmitting the second metadata to a puppet animation system, or to a metadata database.

20. The method of claim 17, further comprising:
    causing an animation interface to be displayed by the client device, wherein the animation interface includes the one of the plurality of puppets in the second pose.

* * * * *